United States Patent
Kim et al.

(10) Patent No.: US 8,300,206 B2
(45) Date of Patent: Oct. 30, 2012

(54) ELECTRO-OPTIC UNIT HAVING ELECTRO-OPTIC MATERIAL LAYER WITH VARIABLE REFRACTIVE INDEX, DRIVING METHOD OF THE ELECTRO-OPTIC UNIT, AND DISPLAY APPARATUS HAVING THE SAME

(75) Inventors: Sung-Woon Kim, Suwon-si (KR); Hee-Seop Kim, Hwaseong-si (KR); Hae-Young Yun, Suwon-si (KR); Jiangang Lu, Suwon-si (KR); Kyung-Ho Jung, Seoul (KR); Seung-Hoon Lee, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 322 days.

(21) Appl. No.: 12/511,727

(22) Filed: Jul. 29, 2009

(65) Prior Publication Data

US 2010/0026920 A1 Feb. 4, 2010

(30) Foreign Application Priority Data

Jul. 30, 2008 (KR) .................. 10-2008-0074735

(51) Int. Cl.
*G02F 1/13* (2006.01)
*G02F 1/1335* (2006.01)
*G02B 27/10* (2006.01)

(52) U.S. Cl. .......... 349/202; 349/200; 349/201; 349/95; 349/15; 359/618; 359/619; 359/620

(58) Field of Classification Search .................. 349/12, 349/15, 95, 200–202; 359/618–620; 365/12
See application file for complete search history.

(56) References Cited

U.S. PATENT DOCUMENTS

| | | | | |
|---|---|---|---|---|
| 6,469,683 | B1 * | 10/2002 | Suyama et al. | 345/32 |
| 6,864,951 | B1 * | 3/2005 | Ren et al. | 349/200 |
| 7,369,327 | B1 * | 5/2008 | Nishioka | 359/726 |
| 7,375,784 | B2 * | 5/2008 | Smith et al. | 349/129 |
| 7,388,822 | B2 * | 6/2008 | Ooi et al. | 369/112.02 |
| 2007/0008617 | A1 * | 1/2007 | Shestak et al. | 359/455 |
| 2008/0278641 | A1 * | 11/2008 | Uehara | 349/15 |

FOREIGN PATENT DOCUMENTS

| | | | |
|---|---|---|---|
| GB | 2455614 | * | 6/2009 |
| JP | 2000-102038 | | 4/2000 |
| JP | 2000-261833 | | 9/2000 |
| JP | 2004184966 | * | 7/2004 |
| JP | 3969252 | | 6/2007 |
| KR | 1020030022583 | | 3/2003 |

* cited by examiner

*Primary Examiner* — Hoan C Nguyen
(74) *Attorney, Agent, or Firm* — H.C. Park & Associates, PLC

(57) ABSTRACT

The present invention provides an electro-optic unit. A lens unit disposed at an upper portion of a display panel has a plurality of lens part. An electro-optic unit is disposed between a display panel and a lens unit, and includes an electro-optic material layer formed as a graded refractive index lens in an electric field. A display device shows a two-dimensional and a three-dimensional image according to a mode of the electro-optic unit. A driving part may form the graded refractive index lens to have the same pitch as the pitch of the lens part. The graded refractive index lens may be formed as a convex lens or a Fresnel lens. The electro-optic unit is displayed to form the Fresnel lens. A driving method enhancing mode conversion velocity of the electro-optic unit is displayed.

23 Claims, 22 Drawing Sheets

ELECTRO-OPTIC UNIT HAVING ELECTRO-OPTIC MATERIAL LAYER WITH VARIABLE REFRACTIVE INDEX, DRIVING METHOD OF THE ELECTRO-OPTIC UNIT, AND DISPLAY APPARATUS HAVING THE SAME

CROSS REFERENCE TO RELATED APPLICATION

This application claims priority from and the benefit of Korean Patent Application No. 2008-74735, filed on Jul. 30, 2008, which is hereby incorporated by reference for all purposes as if fully set forth herein.

BACKGROUND OF THE INVENTION

1. Field of the Invention

The present invention relates to an electro-optic unit forming a variable lens converting a mode by a liquid crystal, a driving method of the electro-optic unit, and a display device that embodies selectively a two-dimensional image and three-dimensional image.

2. Discussion of the Background

A three-dimensional image display showing 3D images may be classified according to 3D display method, viewpoints, observing conditions, and whether or not an observer wears glasses. As an observed image is input to both eyes at different angles, the spaciousness of the image is perceived through brain functions.

The 3D display shows the image having a time difference, and thus a viewer may feel dizziness by observing the image. Therefore, a display having a function of 2D/3D image conversion may be necessary.

A 2D/3D conversion display including a polarized light conversion method using an anisotropic lens and a switching cell method is known. However, the anisotropic lens may be expensive and the manufacturing process may be complex, and the refractive-index anisotropy of liquid crystal or polymer liquid crystal may be smaller than a required refractive-index anisotropy, and thus manufacturing a large-size panel may be difficult.

For example, in the case of a 52-inch 9-view 3D display, a 100 μm cell gap or lens thickness may be required, but alignment of a 100 μm thick liquid crystal layer may be very difficult.

SUMMARY ON THE INVENTION

The present invention provides an electro-optic unit having a 2D/3D mode conversion.

The present invention also provides a driving method of an electro-optic unit capable of enhancing mode conversion velocity.

The present invention also provides a display device including an electro-optic unit having a 2D/3D mode conversion.

The present invention also provides an electro-optic unit and a display device having the same that may quickly achieve a 2D/3D conversion, and manufacturing of an enlarged display device that may be easily achieved.

Additional features of the invention will be set forth in the description which follows, and in part will be apparent from the description, or may be learned by practice of the invention.

The present invention discloses a display device that includes a display panel, a lens unit, and an electro-optic unit. The display panel emits an image, and the lens unit including a plurality of lens part is disposed at an image-emitting direction. The electro-optic unit is disposed between the display panel and the lens unit, and has an electro-optic material layer. The electro-optic material layer is driven to change a refractive index, and thus a graded refractive index lens is formed. The display device shows a two-dimensional image and a three-dimensional image according to a mode of the electro-optic unit.

The present invention also discloses a display device that includes a display panel, a first electro-optic unit, and a second electro-optic unit. The first electro-optic unit is disposed at an upper portion of the display panel, and includes a first electro-optic material layer. The first electro-optic unit is driven to change a refractive index in an electric field, and thus a first graded refractive index lens is formed. The second electro-optic unit is disposed at an upper portion of the first electro-optic unit, and includes a second electro-optic material layer. The second electro-optic unit is driven to change a refractive index in an electric field, and thus a second graded refractive index lens is formed. The display device shows a two-dimensional image and a three-dimensional image according to a mode of the first electro-optic unit and the second electro-optic unit.

The present invention also discloses an electro-optic unit that includes a first substrate, a second substrate, an electro-optic material layer, and an electric field interference protection wall. The electro-optic material layer is disposed between the first substrate and the second substrate. The graded refractive index lens having a Fresnel lens shape is formed by an electric field. The electric field interference protection wall extending to the electro optical material layer from the first substrate is formed corresponding to a boundary of a sub-lens.

The present invention also discloses an electro-optic unit that includes a liquid crystal layer and an electro-optic material layer according to a voltage application. The voltage from a first voltage to second voltage is applied corresponding to a center of graded refractive index lens at the stationary state. The driving method of an electro-optic unit, a voltage is turned off at a first section of the graded refractive index lens where the voltage from first voltage to third voltage is applied. The first voltage is applied at a second section of the graded refractive index lens during a first time. The voltage is turned off at a second section of the graded refractive index lens after a first time. Therefore, the electro-optic material layer operates in a first mode as a liquid crystal layer. The electro-optic material layer at the first and second section has a uniform first refractive index at the end of the first time. The voltage at the first section and the second section is turned off, and the electro-optic material layer has a uniform second refractive index altered from the first refractive index. The voltage from the third voltage to second voltage is applied to the second section of liquid crystal layer. The fourth voltage is applied to the first section of liquid crystal layer during the second time. After the second time, the voltage from the first voltage to third voltage is applied to the first section of the liquid crystal layer. Thus, the electro-optic material layer operates in a second mode as the graded refractive index lens.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
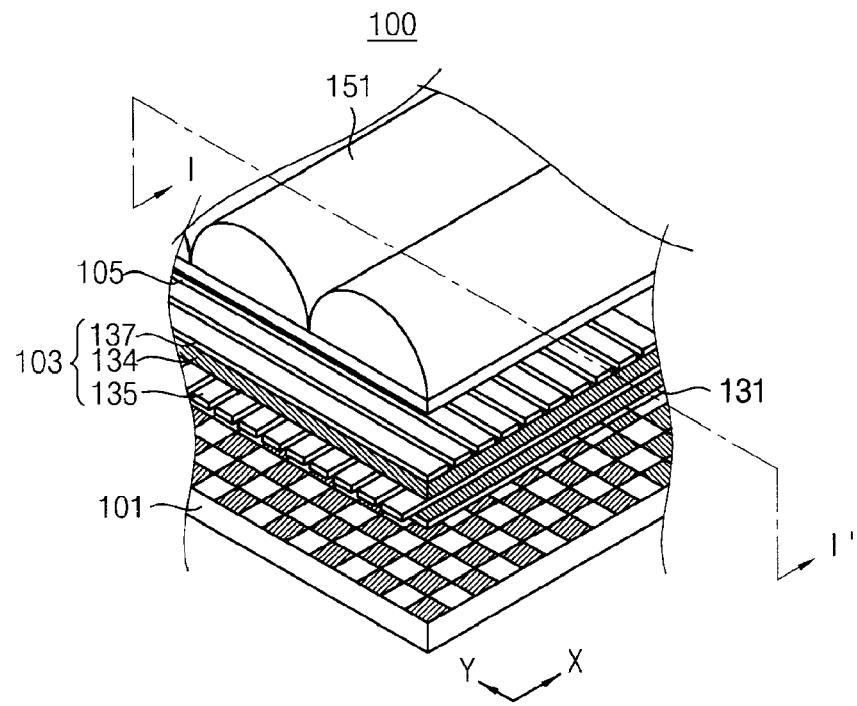
FIG. 1 is a partially disassembly perspective view showing a display device in accordance with a first exemplary embodiment.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
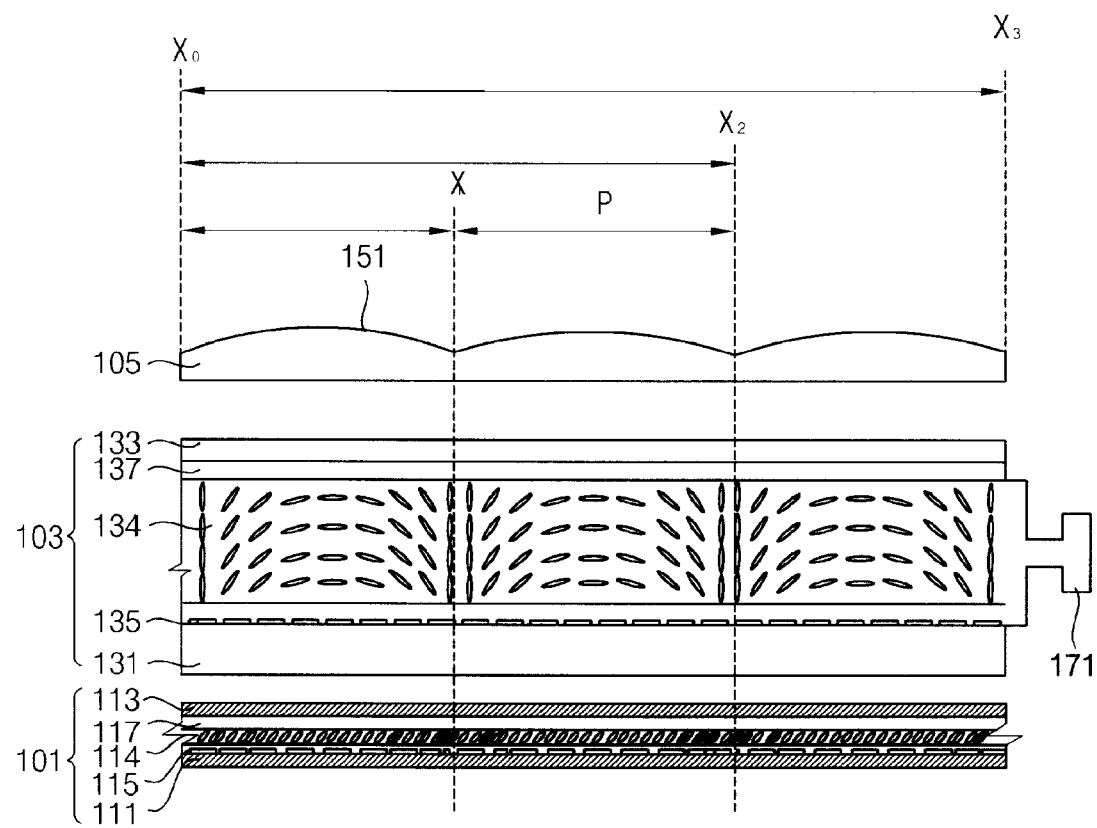
FIG. 2 is a cross-sectional view taken along line I-I' in FIG. 1.

FIG. 1 is a partially disassembly perspective view showing a display device in accordance with a first exemplary embodiment of the present invention. FIG. 2 is a cross-sectional view taken along line I-I' in FIG. 1.

Referring to FIG. 1 and FIG. 2, a display device 100 includes a display panel 101, an electro-optic unit 103, and a lens unit 105.

The display panel 101 having a plurality of pixels displays an image. A general image display device, for example, a liquid crystal display (LCD) device, a plasma display device, and an electric luminescence display may be used, and the above image displays have a high resolution and a small pitch size. Thus, the display panel 101 displays the image in response to an image signal which is applied from outside.

In the first exemplary embodiment, the display panel 101 is shown, for example, as a LCD panel 101. The LCD panel 101 includes a first substrate 111, a second substrate 113, and a first liquid crystal layer 114 which is disposed between the first substrate 111 and the second substrate 113. Each of pixel electrodes 115 is formed at each of a plurality of pixel regions aligned in a matrix of the first substrate 111. The each of pixel electrodes 115 connected to each of a switch element is actively or respectively controlled as on or off.

A common electrode 117 opposing the pixel electrodes 115 is disposed at the second substrate 113. R, G, and B color filters (not shown) corresponding to each of the pixel regions may be disposed at the second substrate 113. Alternatively, a white color filter may be added.

The first liquid crystal layer 114 is disposed between the pixel electrodes 115 and the common electrode 117. In an exemplary embodiment, the common electrode 117 may be disposed at the same substrate as the pixel electrodes. In an exemplary embodiment, the R,G and B color filters may be disposed at the same substrate as the pixel electrodes 115. and the common electrode 117 may be disposed at a different substrate. In an exemplary embodiment, the R,G and B color filters may be disposed at the same substrate as the pixel electrodes 115. and the common electrode 117 may be also disposed at the same substrate as the pixel electrodes 115.

The LCD panel 101 displays a two-dimensional image, using a light from a backlight (not shown) arranged behind the display panel 101, and a driving signal that is transmitted from an external driver (not shown) is applied to generate a potential difference between the pixel electrodes 115 and the common electrode 117.

The two-dimensional image is displayed as it passes through the lens unit 105 according to a mode of the electro-optic unit 103, or a three-dimensional image converted from the two-dimensional image is displayed through the lens unit 105 according to a mode of the electro-optic unit 103.

Figure 3:
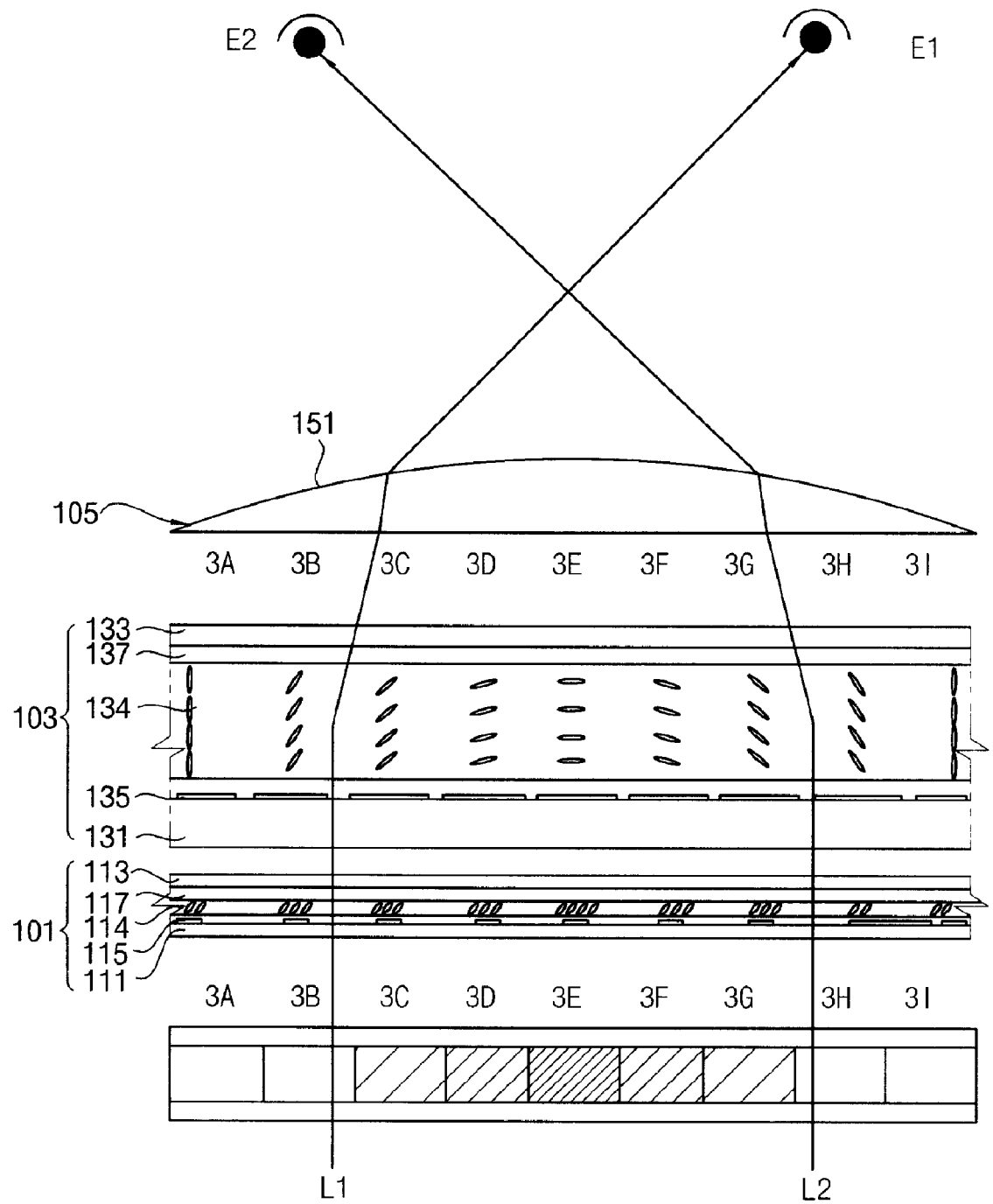
FIG. 3 is an enlarged cross-sectional view showing a variable lens structure in FIG. 2.

FIG. 3 is an enlarged cross-sectional view showing a variable lens structure in FIG. 2

Referring to FIG. 2 and FIG. 3, the electro-optic unit 103 transmits the emitting image from the display panel 101 in an unconverted state, or converts the emitting image from the display panel 101 into a three-dimensional image according to a selected mode. The electro-optic unit 103 may include a lower substrate 131, lower electrode lines 135, an upper substrate 133, upper electrode lines 137, and a second liquid crystal layer 134.

The lower substrate 131 is disposed at an upper display screen of the display panel 101. The upper substrate 133 is disposed at an upper portion of the lower substrate 131. The lower substrate 131 and upper substrate 133 may be manufactured using glass or plastic having light transmittance.

Referring to FIG. 1 and FIG. 3, the lower electrode lines 135 extend in a first direction (x) and are formed at the top surface of the lower substrate 131. An insulation layer (not shown) may be formed between the lower electrode line 135 and the lower substrate 131, and the lower electrode lines 135 may be covered by a second insulation layer (not shown) so that the lower electrode lines 135 are electrically insulated from each other.

The respective lower electrode line 135 is disposed corresponding to the respective pixel region of the display panel 101. Thus, the line width of the lower electrode line 135 may be substantially similar to the pixel region or the pixel electrode 115. An end of the lower electrode line 135 is electrically connected to the external driver, and a mode selection signal is applied to the end of the lower electrode line 135. In an exemplary embodiment, each of the pixel region of the display panel 101 may correspond to a plurality of the lower electrode lines 135. For example, each of the pixel region of the display panel 101 may correspond to 10 number of the lower electrode lines.

The upper electrode lines 137 are disposed on a bottom side of the upper substrate 133 and extend in a second direction (y) which is perpendicular to the first direction (x). The lower electrode line 135 and upper electrode line 137 include a transparent conductive material having light transmittance similar to that of a material of the pixel electrode 115, for example, the transparent conductive material may be indium tin oxide (ITO) or indium zinc oxide (IZO). In an exemplary embodiment, one upper electrode line 137 may be disposed on the bottom side of the upper substrate 133 and extend in the first direction (x) and the second direction (y) like the common electrode lines.

A region where the upper electrode line 137 and the lower electrode line 135 are overlapped with each other respectively corresponds to the pixel region of the display panel 101. Namely, the width of the upper electrode line 137 and lower electrode line 135 is formed corresponding to a size of the pixel region, and the second liquid crystal layer 134, which is powered up by the lower electrode line 135, is controlled by the pixel unit. In an exemplary embodiment, each of the pixel region of the display panel 101 may correspond to a plurality of the lower electrode lines 135. In accordance with voltages to apply to the plurality of the lower electrode lines and the upper electrode line 137, the second liquid crystal layer 134 may be controlled at the pixel unit.

The second liquid crystal layer 134 is disposed between the lower electrode line 135 and the upper electrode line 137. The second liquid crystal layer 134 includes an electro-optic material having a refractive index changed by a voltage applied by an external power supply. The second liquid crystal layer 134 includes an electro-optic material, for example, and the electro-optic material may be a liquid crystal or liquid crystal polyester.

An alignment layer (not shown) may be further formed on the lower electrode line 135 and the upper electrode line 137. The alignment layer may be aligned according to the prior art, and through the alignment layer, a nematic liquid crystal may be aligned to be formed horizontal to the lower substrate 131 and upper substrate 133 in the state of power off.

The voltage is applied to the lower electrode line 135 and upper electrode line 137, and an orientation changes according to the magnitude of the applied the voltage so that the refractive index of the nematic liquid crystal changes. The refractive index of the nematic liquid crystal may change from 1.52 to 1.75. A transmitting light amount may change according to variation of the refractive index.

Figure 4:
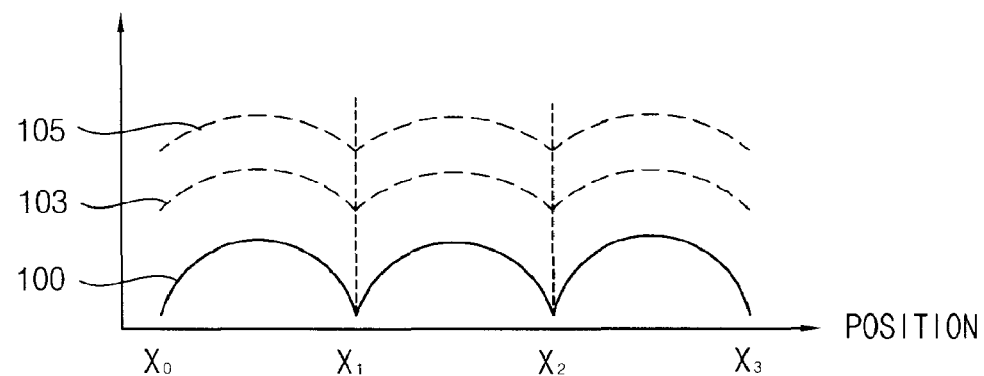
FIG. 4 is a graph showing a refractive index according to a position of the display device in FIG. 2.

FIG. 4 is a graph showing a refractive index according to a position of the display device 100 in FIG. 2.

Referring to FIG. 2, FIG. 3, and FIG. 4, a level of the voltage, which is applied to the lower electrode line 135 with respect to the voltage applied to the upper electrode line 137, is applied to the second direction (y) perpendicular to the first direction (x) and varied in order, and the voltage applied to the lower electrode line 135 changes in periodically. Thus, the liquid crystal in the second liquid crystal layer 134 is aligned so that the orientation of the liquid crystal changes in periodically. An array of the liquid crystal formed periodically is referred to as a variable lens structure. The variable lens structure is named as a graded refractive index lens (grin lens), and functions as a lens. A pitch (P) and a refractive index of the variable lens structure in FIG. 4 may be altered according to an application method of the power supply.

A horizontal axis in FIG. 4 shows a spacing distance from a one side edge of the display device 100 to the second direction (y) perpendicular to the first direction (x). X1, X2, and X3 in FIG. 4 display a position corresponding to a node of the variable lens structure having a convex lens formation as in FIG. 2. The refractive index of the variable lens structure increases closer to the center, similar to the convex lens.

The variable lens structure is extended to the first direction (x), and is formed as a lenticular structure.

The lens unit 105 is disposed at an upper portion of the electro-optic unit 103, and is manufactured using a polymer resin which has excellent light transmittance, light diffusivity, thermal resistance, chemical resistance and mechanical strength. Examples of the polymer resin may include polymethyl methacrylate, polyamide, polyimide, polypropylene and polyurethane.

The lens unit 105 includes a base film having a sheet shape and a lens part 151 formed at the top surface of the base film. The lens part 151, as in FIG. 1, may be the lenticular lens extended to the first direction (x).

Referring to FIG. 2 and FIG. 3, a pitch (P) of the variable lens structure may be formed substantially similar to that of the lens part. The variable lens structure has the pitch including nine lower electrode lines 135. Therefore, the nine lower electrode lines 135 and nine pixels are arranged to the second direction (y) within a width of the lens part 151. In an exemplary embodiment, the plurality of the lower electrode lines 135 may correspond to one pixel. Thus, when the nine pixels are arranged to the second direction (y) within the width of the lens part 151, the lower electrode lines which are more than nine, are arranged to the second direction (y) within the width of the lens part 151.

Hereinafter, how a three-dimensional image of the display panel 101 is embodied is shown.

The nine pixels are displayed corresponding to one pitch of the lens part 151 in FIG. 3. A three-dimensional captured image of a certain object is displayed at the nine pixels. Namely, an image signal captured with a diverse angle is displayed at the nine pixels.

For example, 3B image signal (L1) emitting from 3B pixel is incident to a 3B the electro-optic unit 103 which has the variable lens structure, and is refracted by the variable lens structure toward a center line passing a focus of the lens part 151. The 3B image signal refracted by the variable lens structure is refracted by the lens part 151, and is incident to a left eye (E1) of observer.

At the same time, 3H image signal (L2) emitting from 3H pixel is incident to a 3H the electro-optic unit 103 which has the the variable lens structure, and is refracted by the variable lens structure toward a center line passing a focus of the lens part 151. The 3H image signal refracted by the variable lens structure is refracted by the lens part 151, and is incident to a right eye (E2) of observer.

Therefore, the image signal, which is captured in a plurality of directions, is input to the observer, and a different image signal is input to the left eye (E1) and right eye (E2) of the observer so that the observer feels a three-dimensional effect.

Referring to FIG. 4, the image signal is refracted by a refraction index of the display device 100 so that the three-dimensional image is displayed. The refraction index of the display device 100 is controlled by the refraction of the variable lens structure and the refraction of the lens part 151 so that a focus distance of the display device 100 may be controlled.

Hereinafter, how a two-dimensional image of the display panel 101 is embodied is shown.

Figure 5:
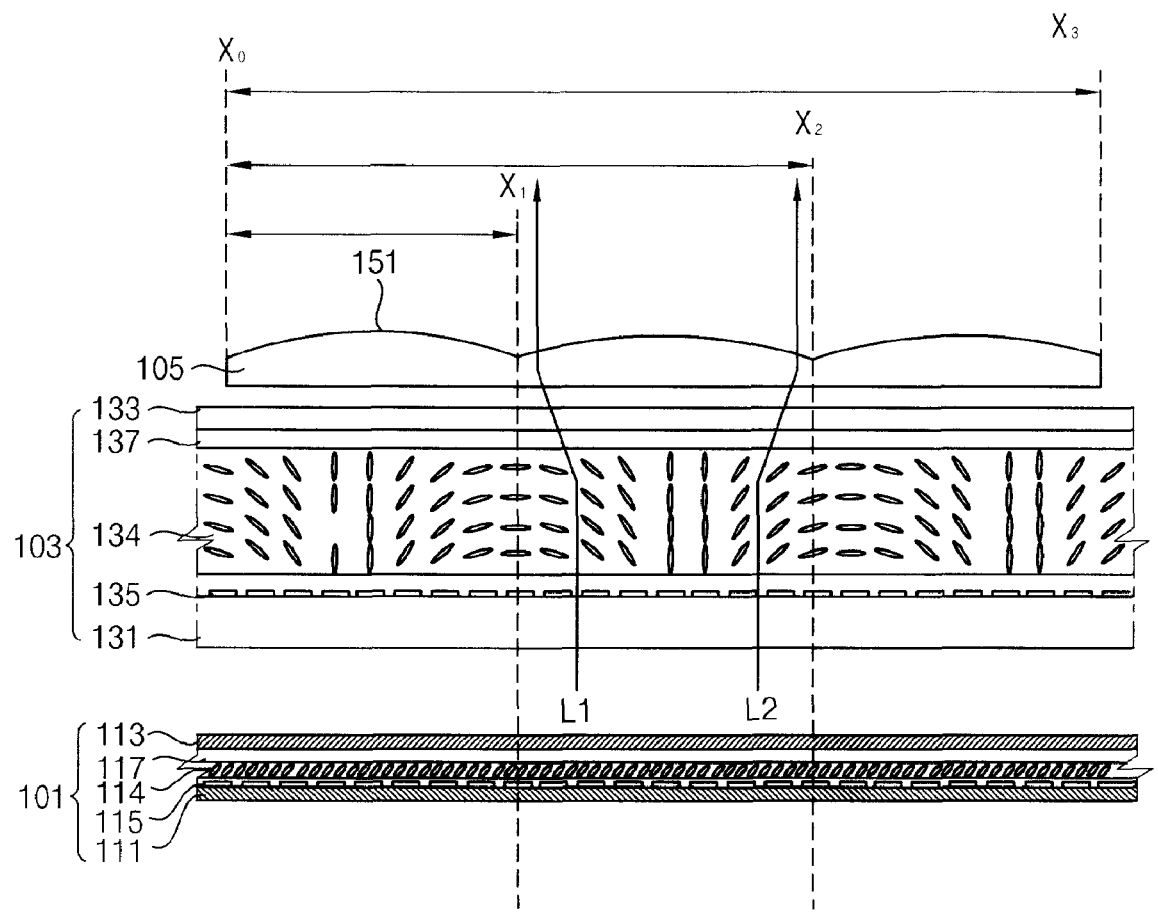
FIG. 5 is a cross-sectional view taken along line I-I' in FIG. 1 in a two-dimensional mode.
Figure 6:
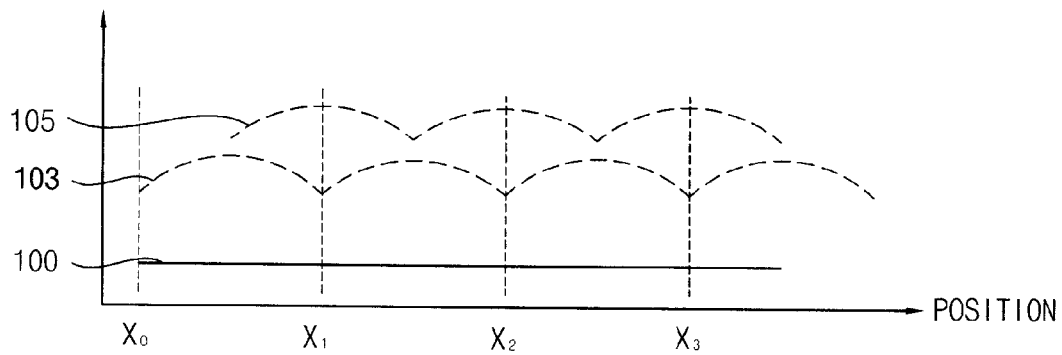
FIG. 6 is a graph showing a refraction index according to a position of the display device in FIG. 5.

FIG. 5 is a cross-sectional view taken along line of I-I' in FIG. 1 in a two-dimensional mode. FIG. 6 is a graph showing a refraction index according to a position of the display device 100 in FIG. 5.

Referring to FIG. 5 and FIG. 6, the variable lens in two-dimensional mode moves as half pitch (P) rather than the pitch (P) in three-dimensional mode so that the pitch (P) in two-dimensional mode may be formed to be substantially the same size as the pitch (P) in three-dimensional mode. Thus, a focus of the variable lens is disposed at a space which is formed by the center lines passing the focus of the lens part 151. Namely, the focus of the variable lens is disposed corresponding to a node where the lens parts 151 connect to each other.

Referring to FIG. 6, a refraction index of the display panel 101, which is calculated as the sum of the refraction index of the lens part 151 and the refraction index of the variable lens, is substantially similar according to a position. Therefore, the image signals (L1, L2) emitting from the display panel 101 do not form the focus, and emit to a direction perpendicular to the display panel 101. Therefore, one image signal, not respectively different image signals, is input to the left eye (E1) and the right eye (E2) of observer. Thus, the observer feels two-dimensional image, and the display device 100 displays a two-dimensional image.

Figure 7:
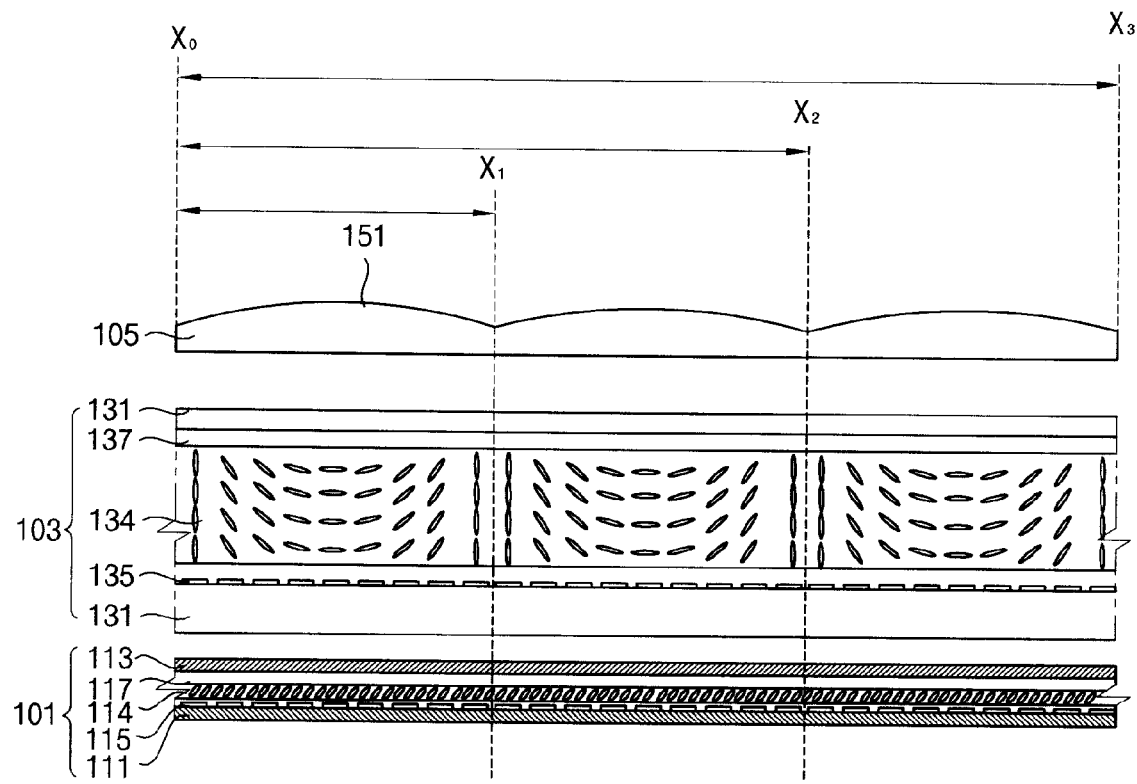
FIG. 7 is a cross-sectional view taken along line I-I' in FIG. 1 in a two-dimensional mode.
Figure 8:
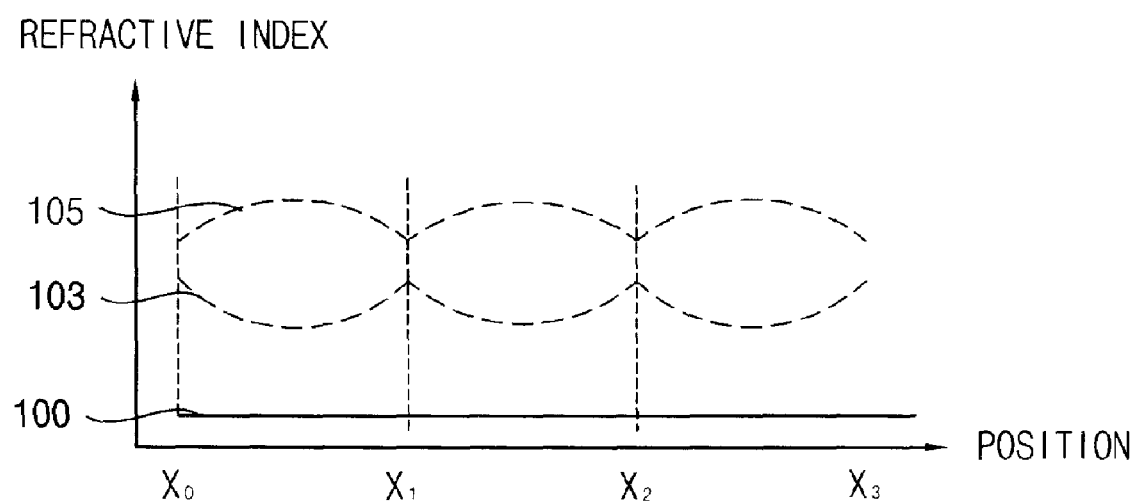
FIG. 8 is a graph showing a refraction index according to a position of the display device in FIG. 7.

FIG. 7 is a cross-sectional view taken along line of I-I' in FIG. 1 in a two-dimensional mode. FIG. 8 is a graph showing a refraction index according to a position of the display device 100 in FIG. 7.

Referring to FIG. 7 and FIG. 8, the pitch (P) of the variable lens is corresponding to the pitch (P) of the lens part 151, but may be formed as a concave lens structure. Therefore, a distribution of the refraction index is distributed as offsetting of the refraction index of the lens part 151 and the variable lens. Thus, the refraction index of the display panel 101 may be uniform regardless of a position so that the display panel 101 displays a two-dimensional image.

Three-dimensional or two-dimensional images are embodied by the refraction index of the display panel 101, which is calculated as the sum of the refraction index of the lens part 151 and the refraction index of the variable lens. Therefore, a focus distance that is necessary for the display device 100 to display a three-dimensional image may be obtained, though a width of the lens part 151 of the lens unit 105 or a cell gap of the electro-optic unit 103 is formed below 100 µm. Thus, the display panel 100 becomes bigger.

The display device 100 having an easy mode conversion is embodied by driving the electro-optic unit 103 electro-optically.

Figure 9:
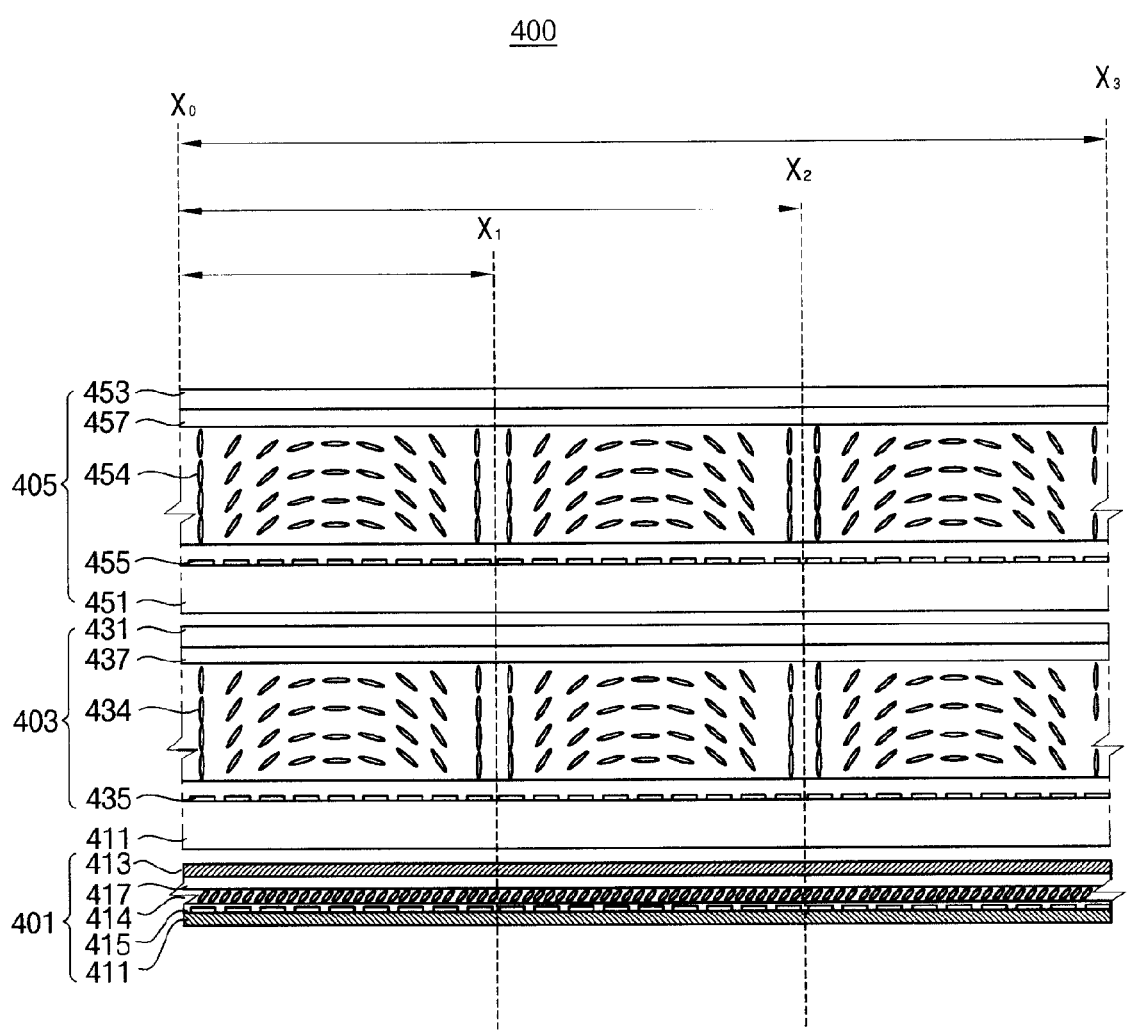
FIG. 9 is a cross-sectional view showing a display device according to a second exemplary embodiment in a three-dimensional mode.
Figure 10:
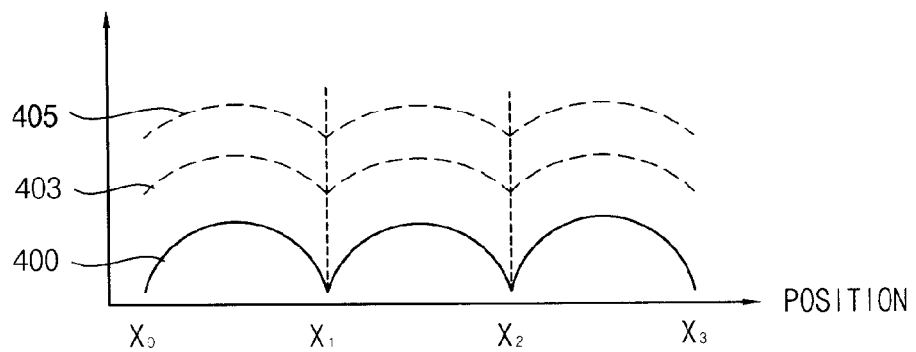
FIG. 10 is a graph showing a refraction index according to a position of the display device in FIG. 9.

FIG. 9 is a cross-sectional view showing a display device 400 according to a second exemplary embodiment of the present invention in a three-dimensional mode. FIG. 10 is a graph showing a refraction index according to a position of the display device 400 in FIG. 9.

Referring to FIG. 9 and FIG. 10, the display device 400 is substantially the same as the display device 100 described in FIG. 1, FIG. 2, FIG. 3, FIG. 4, FIG. 5, and FIG. 6 except that the display device 400 includes a second electro-optic unit 405 instead of the lens unit.

In the second exemplary embodiment, the display device 400 includes a display panel 401, a first electro-optic unit 403 and a second electro-optic unit 405. The first electro-optic unit 403 may be substantially the same as the second electro-optic unit 405.

The first electro-optic unit 403 forms a first variable lens, and the second electro-optic unit 405 forms a second variable lens. A voltage is applied to a lower electrode line 435 and an upper electrode line 437 to conform a pitch (P) and a center line of the first variable lens and second variable lens.

A refraction index of the display panel 401 having a convex lens shape is formed, and three-dimensional image is displayed in FIG. 10.

Figure 11:
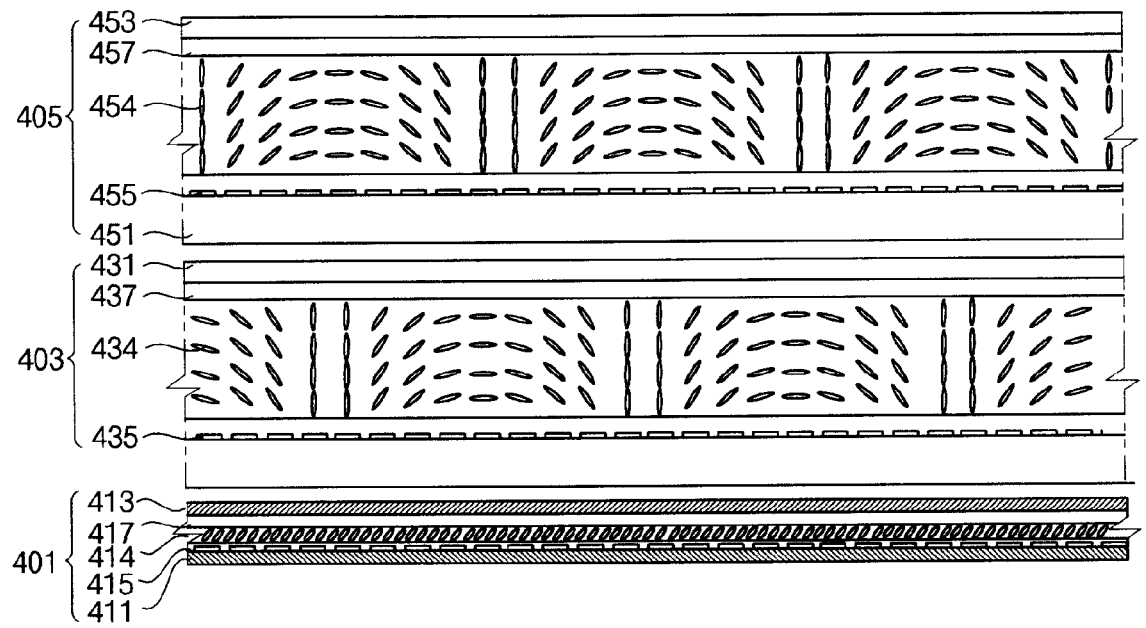
FIG. 11 is a cross-sectional view showing a display device in a two-dimensional mode in FIG. 9.
Figure 12:
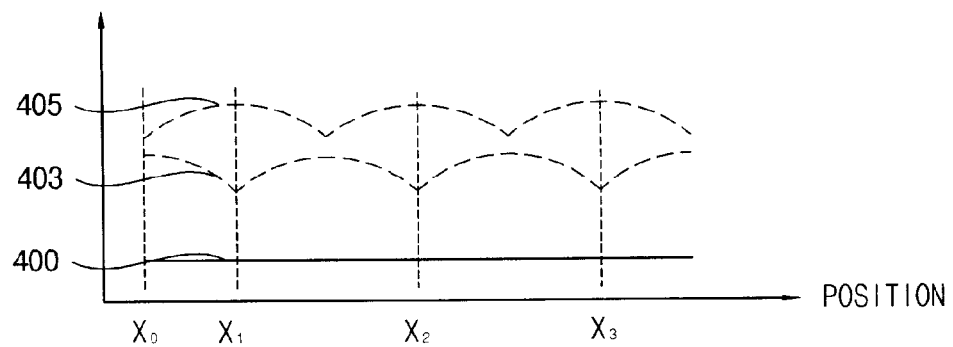
FIG. 12 is a graph showing a refraction index according to a position of the display device in FIG. 11.

FIG. 11 is a cross-sectional view showing a display device in a two-dimensional mode in FIG. 9. FIG. 12 is a graph showing a refraction index according to a position of the display device 400 in FIG. 1.

Referring to FIG. 11 and FIG. 12, the pitch (P) of the first variable lens and the second variable lens is substantially the same, and the center line of the second variable lens may be formed to be a half pitch (P) distant from the center line of the first variable lens.

Therefore, a refraction index of the display panel 401 is formed uniformly so that a two-dimensional image is embodied.

Figure 13:
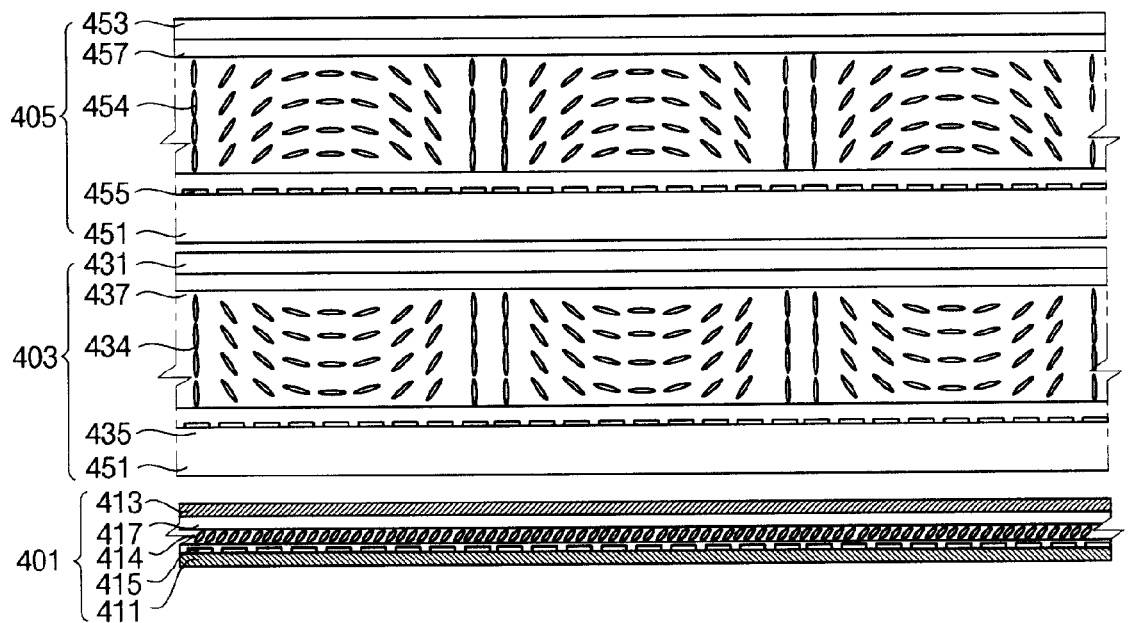
FIG. 13 is a cross-sectional view showing a display device in a two-dimensional mode in FIG. 9.
Figure 14:
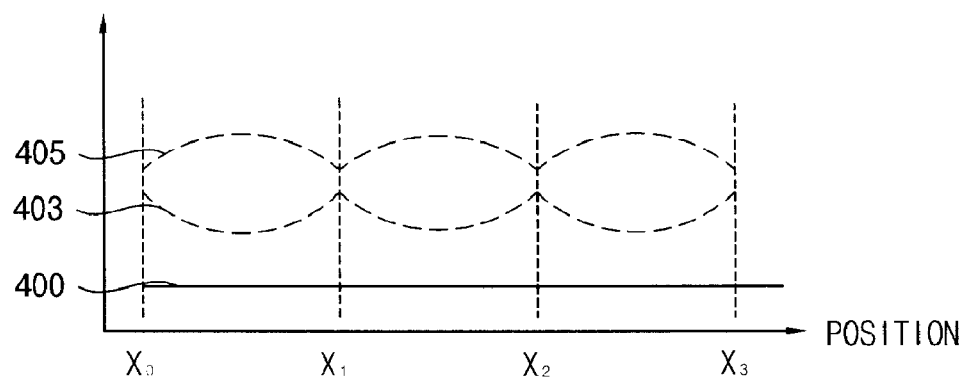
FIG. 14 is a graph showing a refraction index according to a position of the display device in FIG. 13.

FIG. 13 is a cross-sectional view showing a display device 400 in a two-dimensional mode in FIG. 9. FIG. 14 is a graph showing a refraction index according to a position of the display device 400 in FIG. 13.

Referring to FIG. 13 and FIG. 14, a pitch and a center line of the first variable lens and second variable lens is substantially the same, but one may be formed as a convex lens structure and the other may be formed a concave lens structure. For example, in FIG. 13, the first variable lens structure is formed as a convex lens structure, and the second variable lens structure is formed as a concave lens structure. Namely, a refraction index of the first variable lens and second variable lens structure has an offsetting distribution with respect to each other. Thus, a refraction index of the display panel 401 is formed uniformly regardless of a position so that a two-dimensional image is embodied.

According to the second exemplary embodiment, a focus distance is freely controlled by using two electro-optic units so that a various mode conversion is possible.

Figure 15:
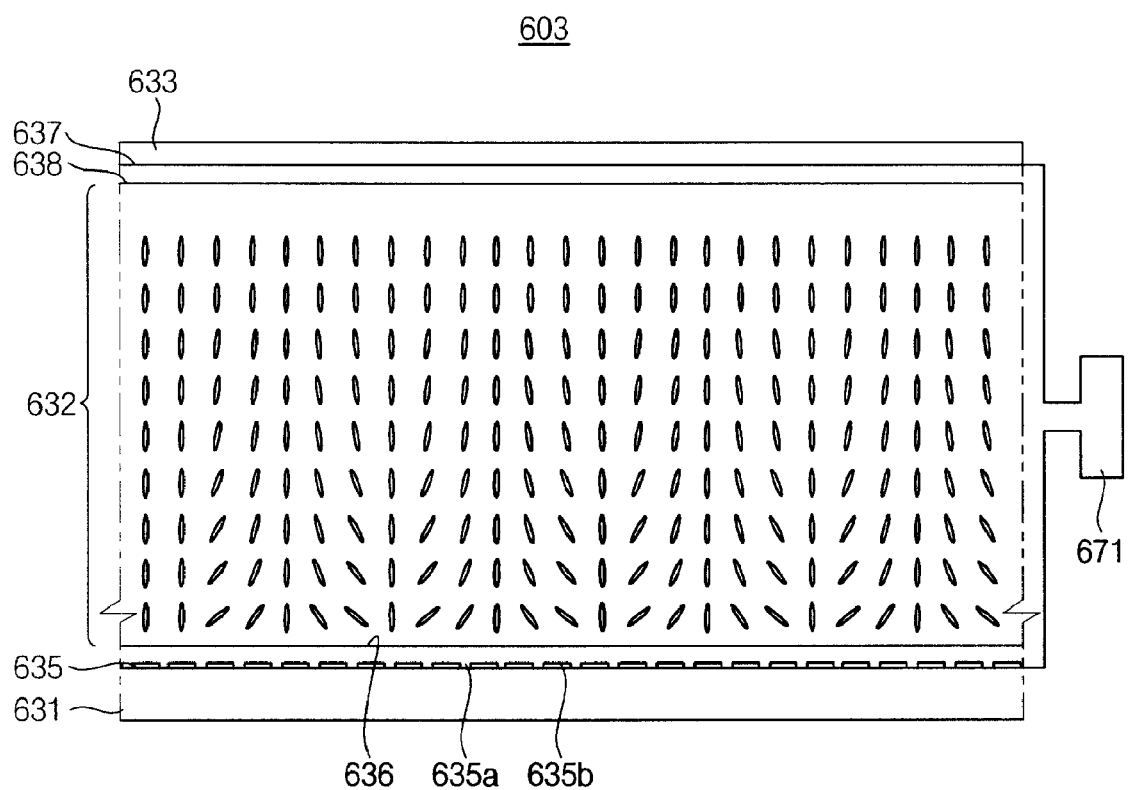
FIG. 15 is a cross-sectional view showing an electro-optic unit according to a third exemplary embodiment.
Figure 16:
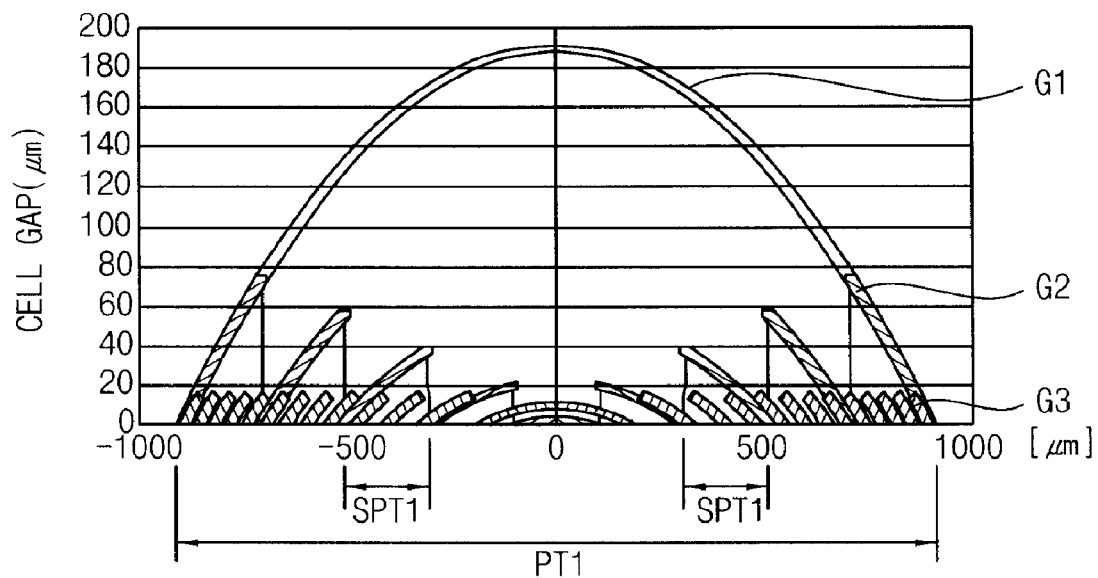
FIG. 16 is a graph showing a refraction index distribution of graded refractive index lens having a Fresnel lens type which is formed by an electro-optic unit in FIG. 15.
Figure 17:
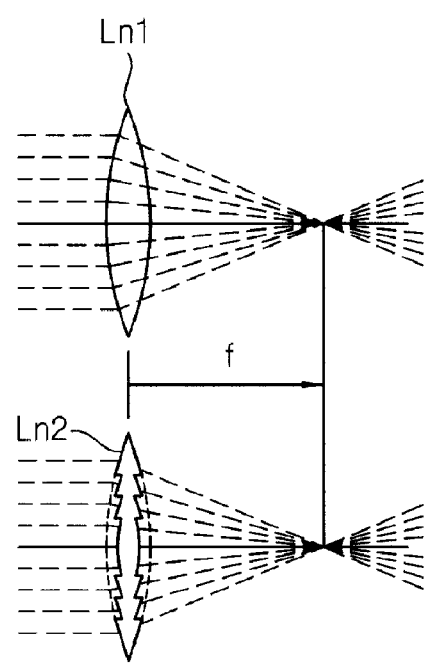
FIG. 17 is a cross-sectional view showing a general convex lens (Ln1) and a Fresnel lens.

FIG. 15 is a cross-sectional view showing an electro-optic unit 603 according to a third exemplary embodiment of the present invention. FIG. 16 is a graph showing a refraction index distribution of a graded refractive index lens (grin lens) having a Fresnel lens type that is formed by an electro-optic unit 603 in FIG. 15. FIG. 17 is a cross-sectional view showing a general convex lens (Ln1) and a Fresnel lens.

Referring to FIG. 15 and FIG. 16, the electro-optic unit 603 is substantially the same as the electro-optic unit 103 described in FIG. 1, FIG. 2, FIG. 3, FIG. 4, FIG. 5, FIG. 6, FIG. 7, and FIG. 8 except that a width of a lower electrode line 635a is altered, and a shape of graded refractive index lens formed by a driving signal applied to a lower electrode line 635 has a Fresnel lens shape. Namely, the refraction index distribution of a graded refractive index lens formed by the driving signal for 3D has a Fresnel lens shape.

A horizontal axis of graph in FIG. 16 shows the pitch of graded refractive index lens, and a center of the graded refractive index lens is displayed as '0'. A vertical axis shows a cell gap, namely the thickness of an electro-optic material layer 632. In FIG. 16, a graph G1 shows a general refraction index of convex lens (Ln1) described in FIG. 17, and a graph G2 shows a refraction index according to a position of Fresnel lens (Ln2) described in FIG. 17.

Referring to FIG. 16 and FIG. 17, the graded refractive index lens is formed as a Fresnel lens shape. One pitch (pt1) of the graded refractive index lens is divided into sub-pitches (spt1) having several equal parts, a plurality of the lower electrode lines 635 disposed at each of the sub-pitches (spt1), a driving voltage corresponding to the each electrode line is applied to the lower electrode lines 635 disposed at each of the sub-pitches (spt1), and the driving voltage makes the electro-optic material 632 corresponding to the lower electrode line 635 have a refraction index described in FIG. 16. The electro-optic material layer 632 corresponding to each of the sub-pitches (spt1) forms a sub-lens. The sub-lens has a refraction index profile corresponding to a part of the convex lens.

The Fresnel lens may have a focus distance substantially the same as the convex lens, but with a much smaller thickness than the convex lens. Because the electro-optic unit 603 makes the graded refractive index lens (grin lens) form as the Fresnel lens shape, the thickness of the electro-optic material layer 632 is greatly reduced. For example, when a 9-view three-dimensional lens is applied to a 52-inch full high-definition (FHD) panel, a cell gap is approximately 190 μm in a general liquid crystal lens. On the other hand, when a sub-pitch (spt1) is approximately 200 μm, the cell gap is reduced to approximately 72 μm.

Figure 18:
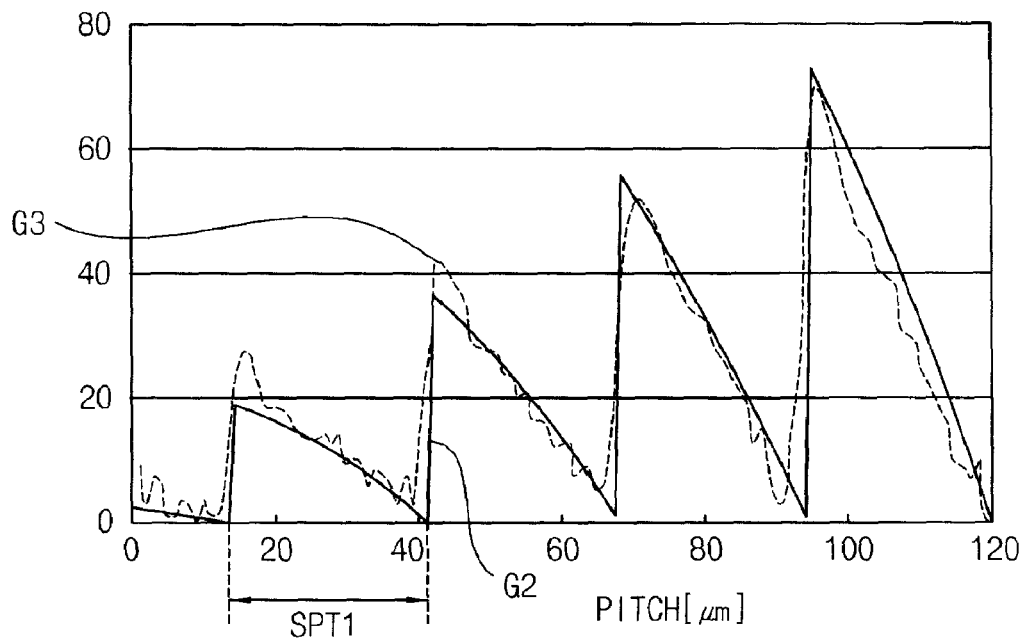
FIG. 18 is a graph showing a refraction index according to a position of sub-lens parts of graded refractive index lens which is formed by the electro-optic unit described in FIG. 15, FIG. 16, and FIG. 17.

FIG. 18 is a graph showing a refraction index according to a position of the sub-lens parts of the graded refractive index lens which is formed at the electro-optic unit 603 described in FIG. 15, FIG. 16, and FIG. 17.

Referring to FIG. 18, each sub-lens has substantially the same sub-pitch (spt1). Therefore, the thickness of each sub-lens increases farther as a distance increases from a center of the Fresnel lens. A horizontal axis shows the distance from the center of the Fresnel lens, a vertical axis shows the thickness of the electro-optic material layer 632.

A graph G2 described with a solid line is a part of the graph G2 described in FIG. 16, and the graph G2 shows a refraction index according to a position of Fresnel lens (Ln2) described in FIG. 17. A graph G3 described with a dot display shows a simulation result of the electro-optic unit 603 described in FIG. 18.

A refraction index at boundary of each sub-lens is rapidly changed in FIG. 18. In case of a refraction index profile of ideal Fresnel lens, an inclination of the refraction index at boundary of the sub-lens is 90 degrees. On the other hand, an inclination of the refraction index at boundary of the sub-lens may be less than 90 degrees at the Fresnel lens formed by the electro-optic unit 603. A narrower width of the lower electrode line 635 corresponding to the boundary of the sub-lens is desirable to approach an inclination of the refraction index at a boundary of the sub-lens to 90 degrees. The width of the lower electrode line 635 corresponding to the boundary is narrower than the other lower electrode line 635b in FIG. 15, and the electrode applied at the boundary is rapidly different to an electrode applied at the other position.

According to the third exemplary embodiment, the display device is substantially the same as the display device 100 described in FIG. 1, FIG. 2, FIG. 3, FIG. 4, FIG. 5, FIG. 6, FIG. 7, and FIG. 8 and the display device 400 described in FIG. 9, FIG. 10, FIG. 11, FIG. 12, FIG. 13, and FIG. 14 except that the display device includes the electro-optic unit 603 in FIG. 15, FIG. 16, FIG. 17, and FIG. 18. Thus, the same reference numeral is used for same elements and the repeated descriptions will be omitted.

The electro-optic unit 603 and the display device having the electro-optic unit 603 according to the third exemplary embodiment, the cell gap is greatly reduced by forming the graded refractive index lens into the Fresnel lens formation. Therefore, the width of the electro-optic unit 603 and the display device is narrower than that of the electro-optic units 103, 403 and 405 and display devices 100 and 400. In an exemplary embodiment, because the cell gap is greatly reduced by forming the graded refractive index lens into the Fresnel lens formation, according to the third exemplary embodiment, the lens unit may be omittable.

Figure 19:
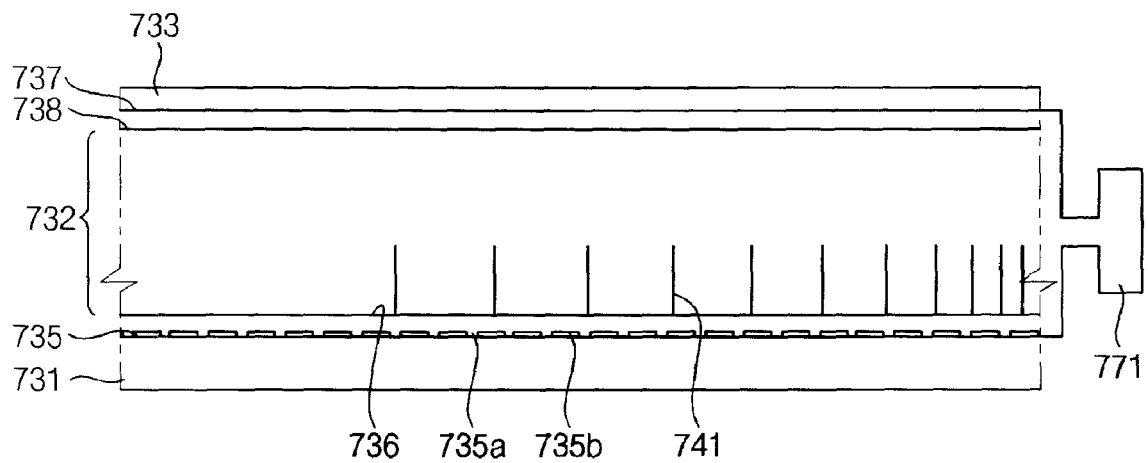
FIG. 19 is a cross-sectional view showing an electro-optic unit according to a fourth exemplary embodiment.

FIG. 19 is a cross-sectional view showing an electro-optic unit 703 according to a fourth exemplary embodiment of the present invention.

Referring to FIG. 19, the electro-optic unit 703 is substantially the same as the electro-optic unit 103 described in FIG. 1, FIG. 2, FIG. 3, FIG. 4, FIG. 5, FIG. 6, FIG. 7, and FIG. 8 except that the electro-optic unit 703 has a Fresnel lens formation that is a shape of a graded refractive index lens formed by the driving signal applied by the lower electrode line 735, and an electric field interference protection wall 741 is extended to an electro-optic material layer 732 from a lower substrate 731 corresponding to a boundary of sub-lenses of which the Fresnel lens is comprised.

According to the present exemplary embodiment, the electro-optic unit 703 further include an electric field interference protection wall 741. The electric field interference protection wall 741 may be comprised of a polymer having electrical insulating property, and chemical and physical stability. And, the electro-optic unit 703 may further include a protection layer which is disposed on the lower electrode line 735. The electric field interference protection wall 741 is formed on the protection layer corresponding to the boundary of sub-lenses of which the Fresnel lens is comprised. The electric field interference protection wall 741 blocks an electrical field interference between adjacent sub-lenses of the Fresnel lens, so the refraction index profile of the sub-lens becomes theoretical.

Figure 20:
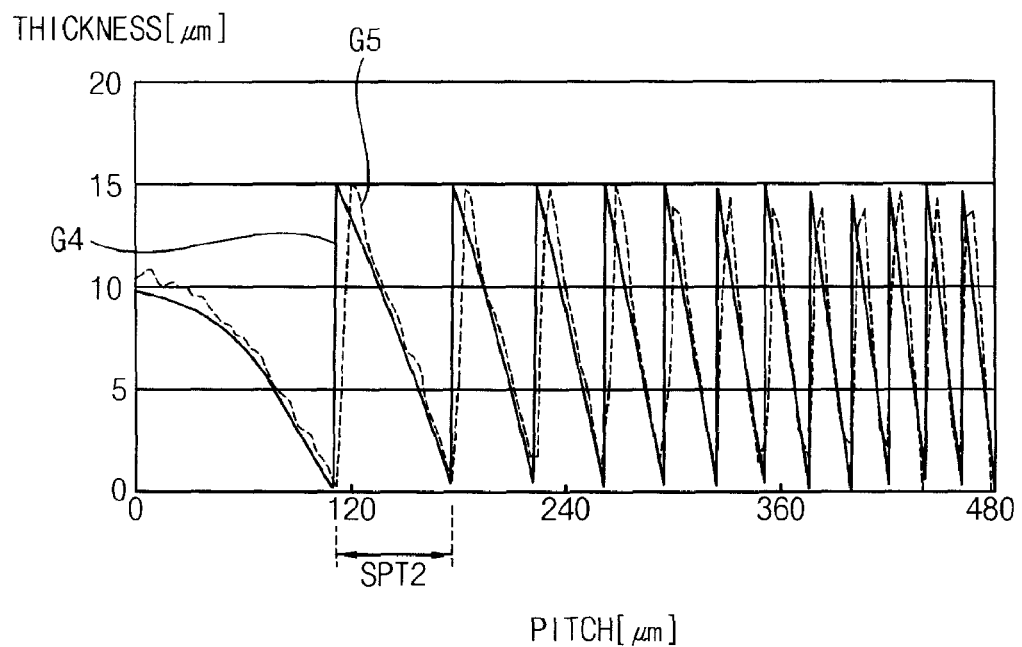
FIG. 20 is a graph showing a refraction index of graded refractive index lens of Fresnel lens type which is formed by the electro-optic unit described in FIG. 19.

FIG. 20 is a graph showing a refraction index of a graded refractive index lens of Fresnel lens type, which is formed by the electro-optic unit 703 described in FIG. 19.

A horizontal axis of the graph in FIG. 20 shows the pitch of the graded refractive index lens having the Fresnel lens shape, and a center of the Fresnel lens is displayed as '0'. A vertical axis shows the thickness of an electro-optic material layer 732. The thickness of the sub-lenses is uniform, and the Fresnel lens is comprised of the sub-lenses. Therefore, each sub-pitch (spt2) is different, a width of the sub-pitch (spt2) is reduced as going far from a center of the Fresnel lens. For example, when a 9-view three-dimensional lens is applied to a 52-inch FHD panel, a cell gap is approximately 190 μm in a general liquid crystal lens. On the other hand, when a minimum sub-pitch (spt2) is approximately 36 μm, the cell gap is reduced to approximately 15 μm. Approximately 15 μm cell gap is a general panel thickness of LCD.

A graph G4 shows a theoretical refraction index profile of Fresnel lens in FIG. 20, and a graph G5 shows a simulation result which is a refraction index of Fresnel lens formed by the electro-optic unit 703 in FIG. 19.

A graph G2 described with a solid line is a part of the graph G2 described in FIG. 16, the graph G2 shows a refraction index according to a position of Fresnel lens (Ln2) described in FIG. 17. A graph G3 described with a dot display shows a simulation result of the electro-optic unit 603 described in FIG. 15. The simulation graph G5 approaches the theoretical graph G4 by the electric field interference protection wall 741.

Figure 21:
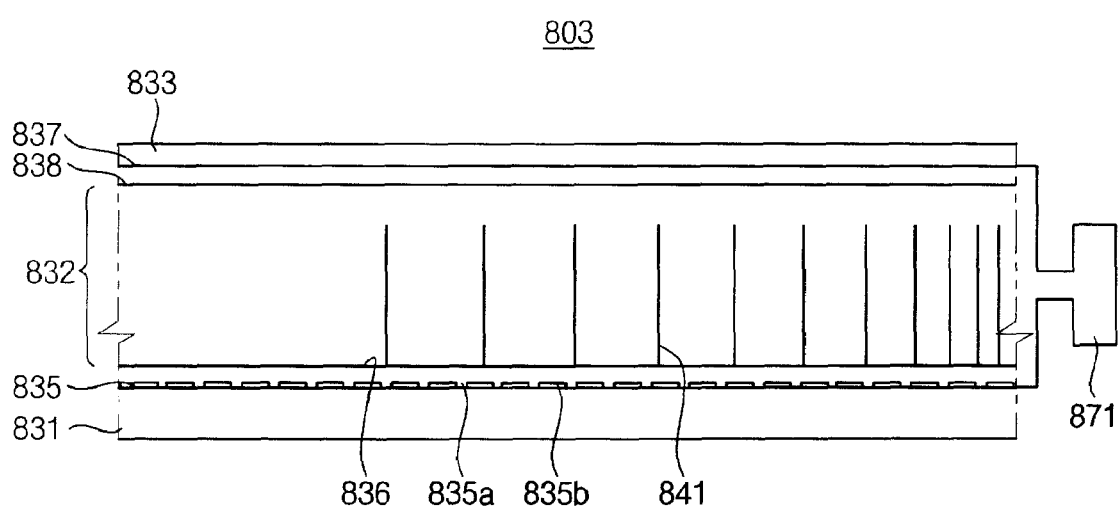
FIG. 21 is a modified example of the electro-optic unit described in FIG. 19.
Figure 22:
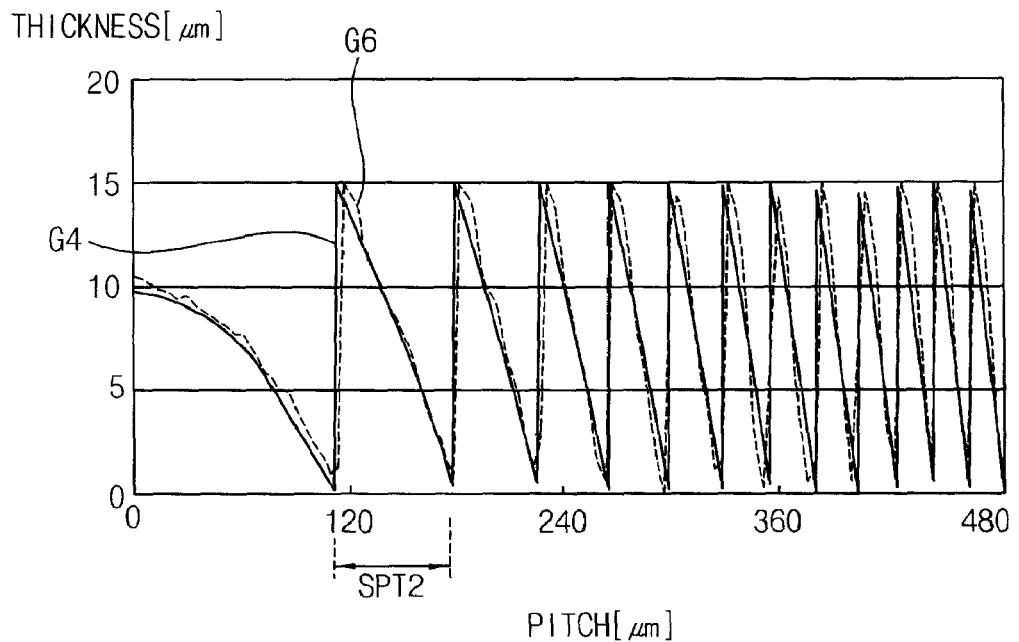
FIG. 22 is a graph showing a refraction index of graded refractive index lens of Fresnel lens type which is formed by the electro-optic unit described in FIG. 21.
Figure 23:
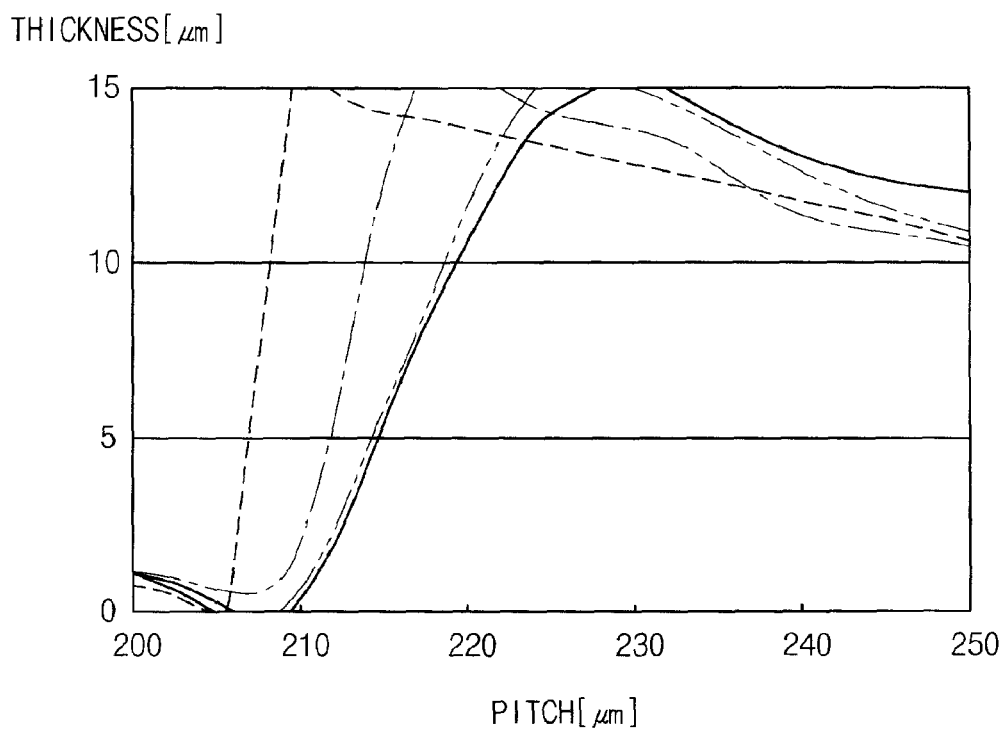
FIG. 23 is a graph showing a change in width of sub-pitch (spt2) and a change in inclination of refraction index at the boundary of a sub-lens in the graded refractive index lens having Fresnel lens type described in FIG. 19, FIG. 20, and FIG. 21.
Figure 24:
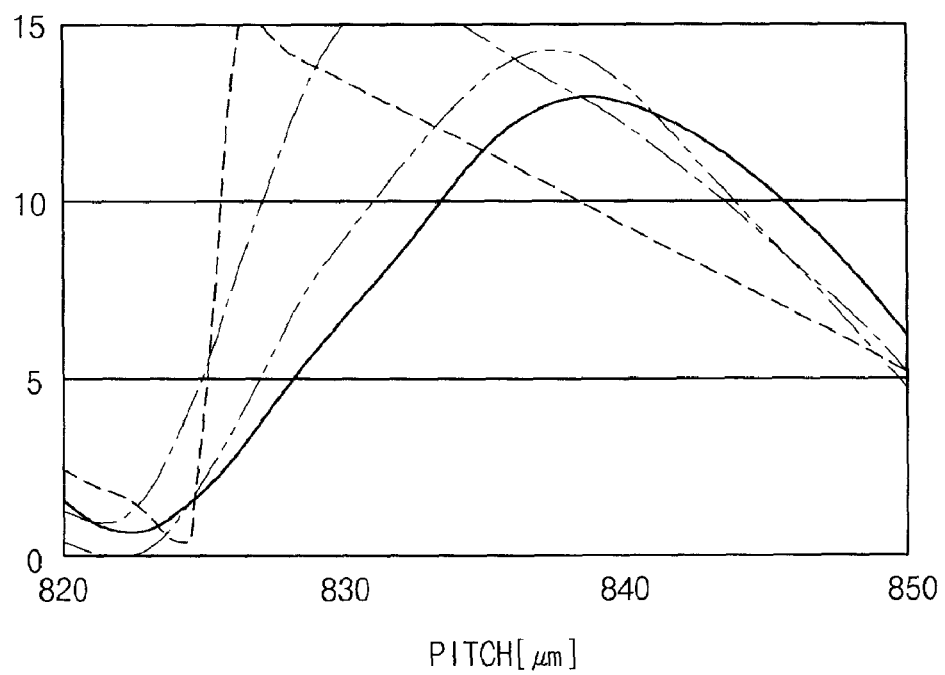
FIG. 24 is a graph showing a change in inclination of refraction index at the boundary of the sub-lens according to an electric field interference protection wall in the graded refractive index lens having Fresnel lens type described in FIG. 19, FIG. 20, and FIG. 21.

FIG. 21 is a modified example of the electro-optic unit 803 described in FIG. 19. FIG. 22 is a graph showing a refraction index of graded refractive index lens of Fresnel lens type which is formed by the electro-optic unit 803 described in FIG. 21. FIG. 23 is a graph showing a change in width of sub-pitch (spt2) and a change in inclination of refraction index at the boundary of sub-lenses in the graded refractive index lens having Fresnel lens type described in FIG. 19 and FIG. 21. FIG. 24 is a graph showing a change in inclination of refraction index at the boundary of the sub-lenses according to an electric field interference protection wall 841 in the graded refractive index lens having the Fresnel lens type described in FIG. 19 and FIG. 21.

In FIG. 21, an electro-optic unit 803 is shown in accordance with another exemplary embodiment of the present invention. The electro-optic unit 803 includes an electric field interference protection wall 841 of increased height compared with the electric field interference protection wall 741 in the electro-optic unit 703 described in FIG. 19. The electric field interference protection wall 741 has a height below half of a cell gap in FIG. 19, and the electric field interference protection wall 841 may be 0.9 times a height of a cell gap in FIG. 21.

Referring to FIG. 23 and FIG. 24, a horizontal axis shows an arbitrary sub-pitch (spt2) described in FIG. 20 and FIG. 22, and a vertical axis shows the thickness of electro-optic material layer 832. The graphs described in FIG. 23 show an interval of the sub-pitch as parameter. An inclination of the graph is gentle as the interval of the sub-pitch (spt2) increases. The graphs described in FIG. 24 show the height of the electric field interference protection wall 841 as parameter, and an inclination of the graph approaches to 90 degrees as the height of the electric field interference protection wall 841 increases.

The refraction index profile of sub-lenses approaches to theoretical formation as the height of the electric field interference protection wall 841 increases.

The simulation refraction index graph G6 of the Fresnel lens described in FIG. 22 further approaches to theoretical graph G4 than the simulation refraction index graph G5 of the Fresnel lens described in FIG. 20.

Figure 25:
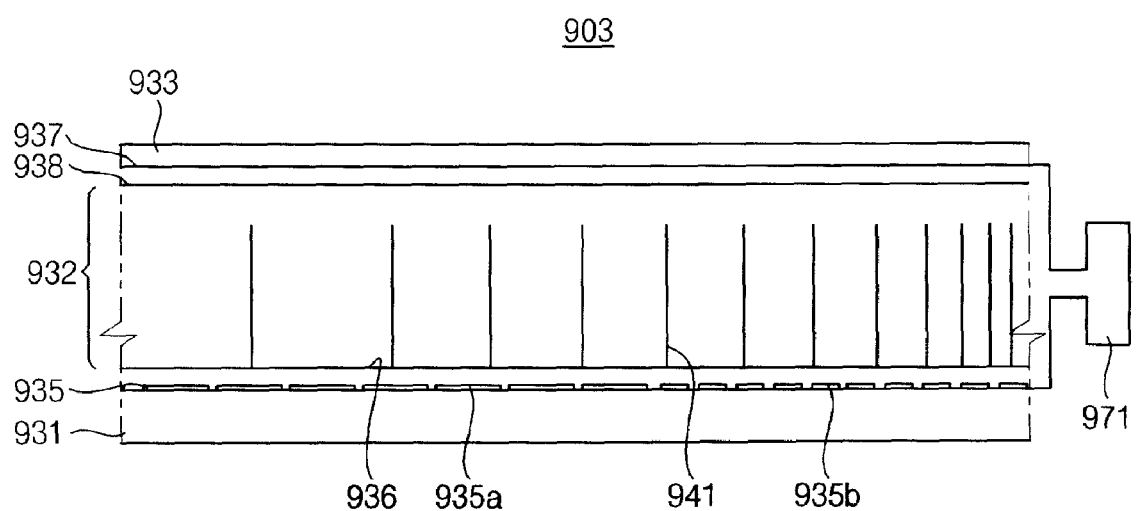
FIG. 25 is a modified example of the electro-optic unit described in FIG. 19.

FIG. 25 is a modified example of the electro-optic unit 703 described in FIG. 19.

In the electro-optic unit 903 described in FIG. 25, a width of a lower electrode line 935*a* is wide at a wide sub-pitch (spt2), and a width of lower electrode line 935*b* is narrow at a narrow sub-pitch (spt2). Referring to FIG. 20 and FIG. 22, the width of the sub-pitch (spt2) increases closer to the center of the Fresnel lens, and the refraction index profile of the sub-lenses is gentle. Therefore, the refraction index profile may be formed at the wide sub-pitch (spt2) by widening the width of the lower electrode line 935*a*, and a wiring number is reduced as a number of the lower electrode line 935 is reduced.

According to the electro-optic units 703, 803, and 903 and the display device having the same described in FIG. 19, FIG. 20, FIG. 21, FIG. 22, FIG. 23, FIG. 24, and FIG. 25, the cell gap is greatly reduced by forming the graded refractive index lens into the Fresnel lens shape. Therefore, the width of the electro-optic units 703, 803, 903 and display device is smaller than the width of the electro-optic units 103, 403, 405 and display device. Also, by equalizing the width of the sub-lenses, the width of the sub-lenses may be reduced to be less than the width of the Fresnel lens described in FIG. 15, FIG. 16, FIG. 17, and FIG. 18. In an exemplary embodiment, According to the electro-optic units 703, 803, and 903, the display device including the electro-optic units 703,803,903 may omit the lens unit 105 or the second electro-optic unit 405 which are described in the first and second exemplary embodiments. Because the width of the electro-optic units 703, 803, 903 is smaller the the width of the electro-optic units 103,403,405 and display device, the refraction index of the electro-optic units 703, 803, 903 maybe the same as the sum of the refraction index of the electro-optic units 103,403 and one of the refraction index of the lens unit 105 or the second electro-optic units 405.

Figure 26:
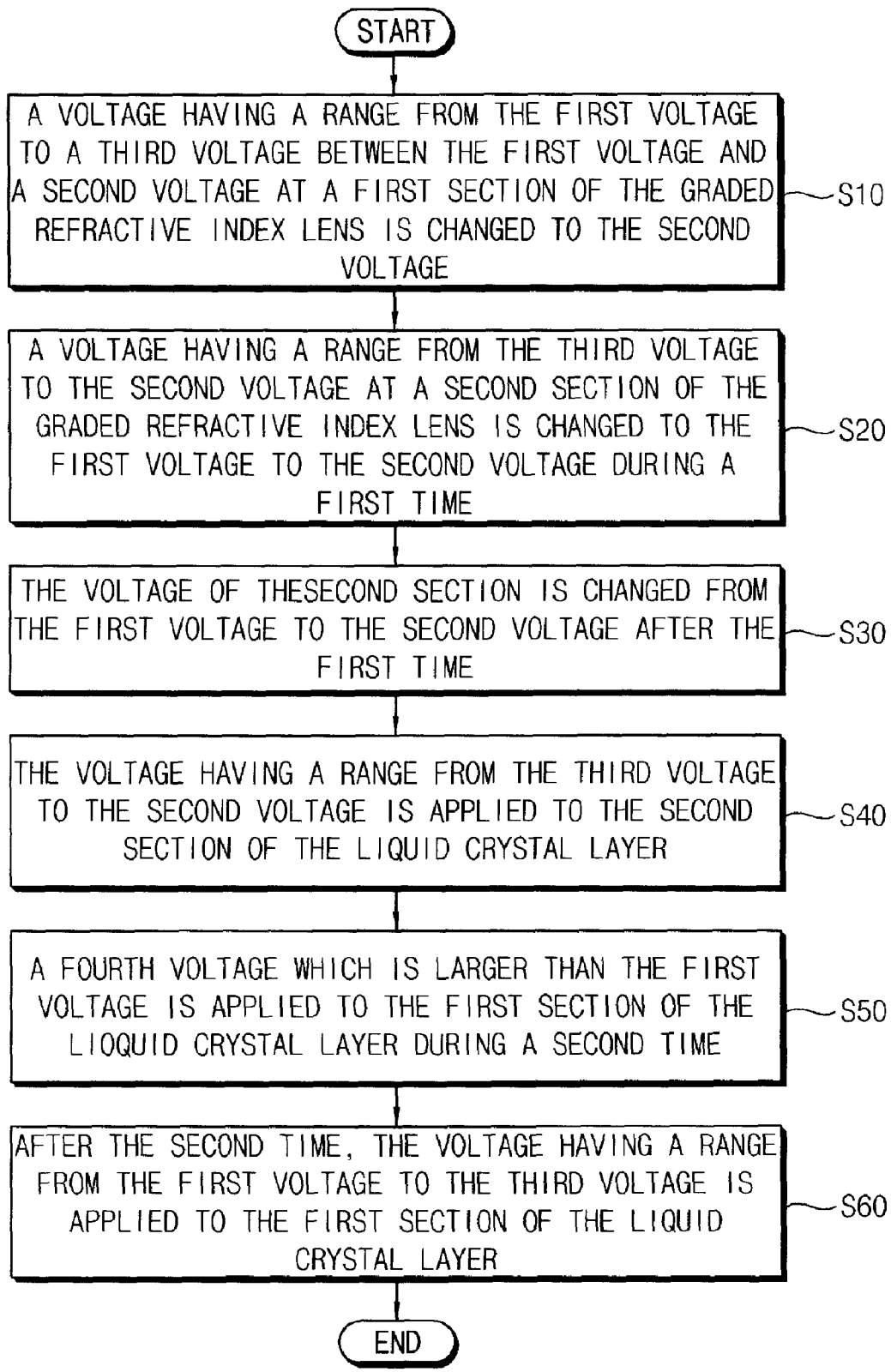
FIG. 26 is a flowchart showing a driving method of electro-optic unit according to the embodiment.
Figure 27:
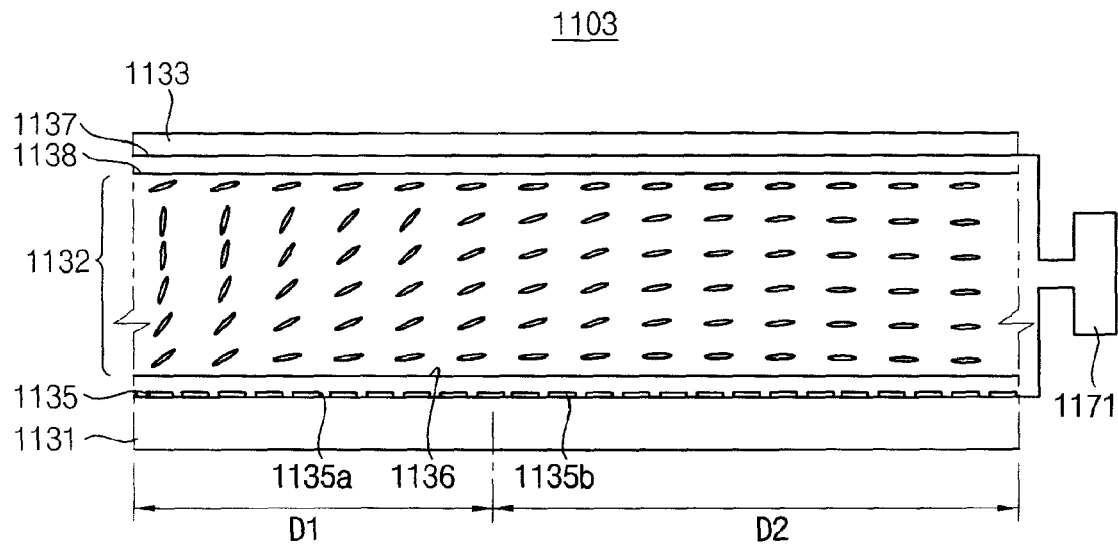
FIG. 27 is a cross-sectional view of a graded refractive index lens of electro-optic unit in a three-dimensional mode.

FIG. 26 is a flowchart showing a driving method of electro-optic unit according to the fifth exemplary embodiment of the present invention. FIG. 27 is a cross-sectional view of a graded refractive index lens of electro-optic unit 1103 in a three-dimensional mode.

Referring to FIG. 26, the driving method of an electro-optic unit according to the present exemplary embodiment is applied to the electro-optic unit 1103. The electro-optic unit 1103 may be one among the electro-optic units 103, 403, 405, 603, 703, 803 and 903.

The electro-optic unit 1103 includes an electro-optic material layer 1132 which is converted from each other as a liquid crystal layer and a graded refractive index lens according to a voltage application, and is applied from a first voltage through a second voltage corresponding to a outline in the graded refractive index lens through a center in the graded refractive index lens in a stationary state. The liquid crystal layer is referred to as an electro-optic material layer 1132 losing a lens function, and having a uniform refraction index. The second voltage is applied to a whole area of the electro-optic unit 1103 to lose a lens function.

In the driving method of the electro-optic unit 1103, a voltage having a range from the first voltage to a third voltage at a first section of the graded refractive index lens is changed to the second voltage. The third voltage is between the first voltage and the second voltage. (step S10) A voltage having a range from the third voltage to the second voltage at a second section of the graded refractive index lens is changed to the first voltage during a first time.(step S20) The voltage of the second section is changed from the first voltage to the second voltage after the first time. (step S30) Therefore, the graded refractive index lens is clear; the electro-optic material layer 1132 is converted to the liquid crystal layer to which the second voltage is applied. After this, the voltage having a range from the third voltage to the second voltage is applied to the second section of the liquid crystal layer. (step S40) A fourth voltage which is larger than the first voltage is applied to the first section of the liquid crystal layer during a second time. (step S50) After the second time, the voltage having a range from the first voltage to the third voltage is applied to the first section of the liquid crystal layer. (step S60) Therefore, the electro-optic material layer 1132 is converted to the graded refractive index lens at the liquid crystal layer. Hereinafter, above steps are shown.

Figure 28:
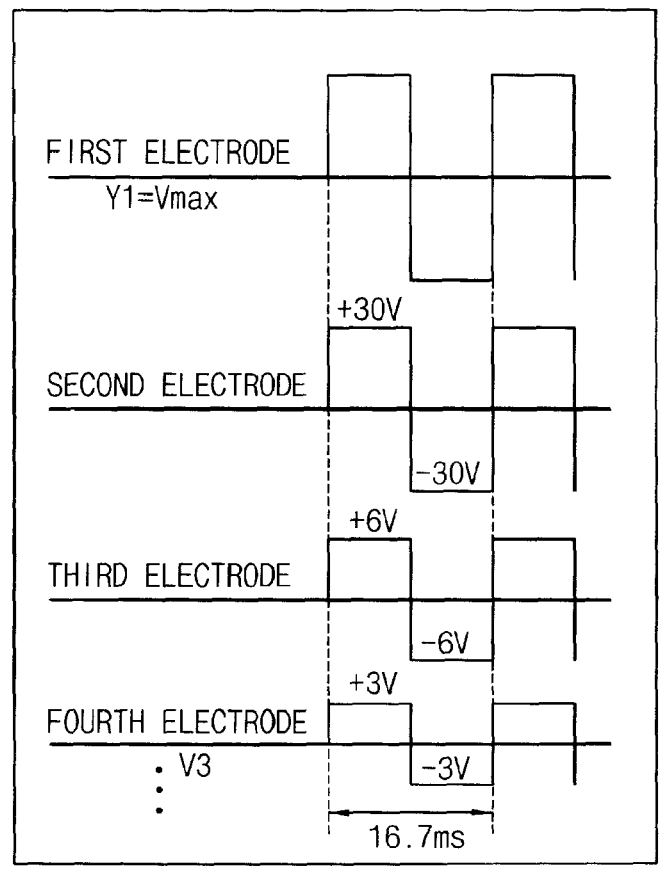
FIG. 28 is a waveform diagram of driving signal applied to the electro-optic material layer in FIG. 27.

FIG. 28 is a waveform diagram of driving signal applied to the electro-optic material layer 1132 in FIG. 27.

Referring to FIG. 27 and FIG. 28, a refraction index is different according to a position because an alignment of liquid crystal 1134 and is altered according to a driving signal applied to a lower electrode line 1135 and upper electrode line 1137. A long axis of the liquid crystal 1134 is parallel with a direction of an electric field. A graded refractive index lens is embodied by the driving signal. The graded refractive index lens has a refraction index profile as a convex lens shape.

In FIG. 27, half pitch part of the graded refractive index lens is disclosed. In FIG. 28, a waveform diagram of the driving signal is disclosed. Referring to FIG. 28, the driving signal applies a first voltage to the liquid crystal corresponding to a node (P1) of the graded refractive index lens through the lower electrode line 1135 and upper electrode line 1137. Also, a second voltage is applied to the liquid crystal corresponding to a center of the graded refractive index lens. The driving signal, which is reduced in stages from the first voltage to the second voltage corresponding to a position between the node and the center may, be applied.

Figure 29A:
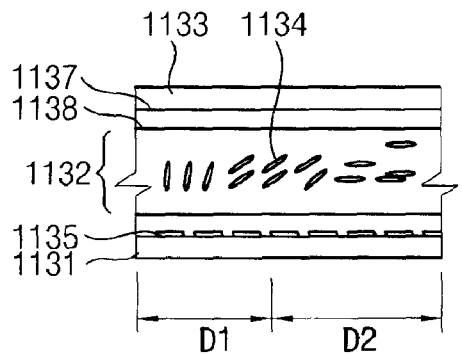
FIG. 29A, FIG. 29B, and FIG. 29C are cross-sectional views showing an electro-optic material layer which is converted to a liquid crystal layer by clearing the electro-optic material layer and the graded refractive index lens described in FIG. 27.
Figure 29B:
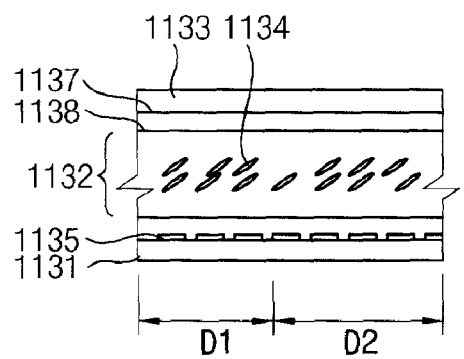
Figure 29C:
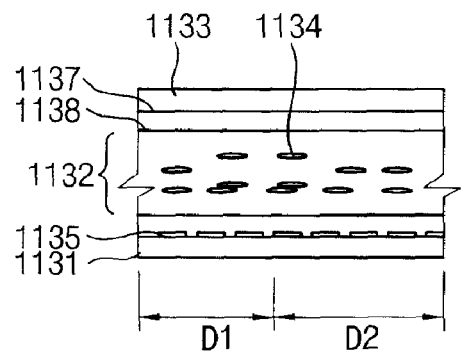
Figure 30:
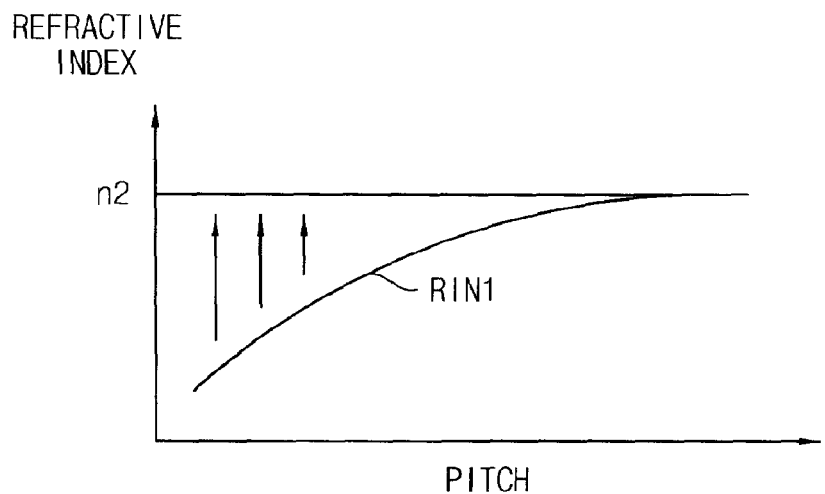
FIG. 30 is a graph showing a change of refraction index of the graded refractive index lens which is converted from three-dimensional mode to two-dimensional mode by turning off a voltage as one step.
Figure 31A:
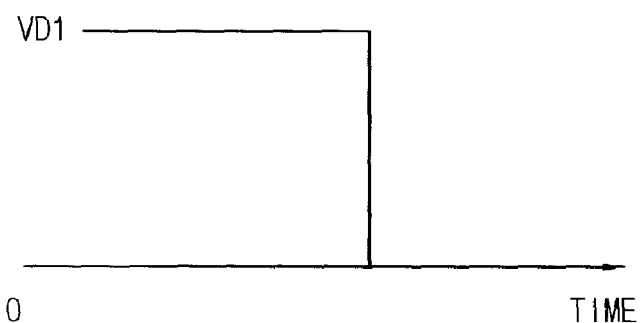
FIG. 31A and FIG. 31B are waveform diagrams showing a driving voltage applied to a liquid crystal layer at mode conversion method described in FIG. 30.
Figure 31B:
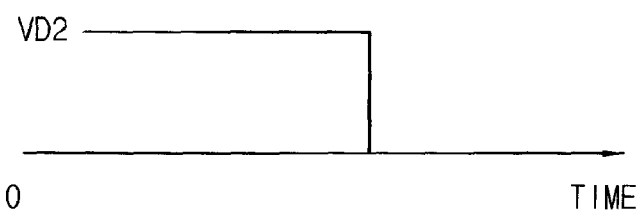

FIG. 29A, FIG. 29B, and FIG. 29C are cross-sectional views showing an electro-optic material layer 1132 that is converted to a liquid crystal layer by clearing the electro-optic material layer 1132 and the graded refractive index lens described in FIG. 27. FIG. 30 is a graph showing a change of refraction index of the graded refractive index lens which is converted from three-dimensional mode to two-dimensional mode by turning off a voltage as one step. FIG. 31A and FIG. 31B is a waveform diagram showing a driving voltage applied to a liquid crystal layer at mode conversion method described in FIG. 30.

In FIG. 30, a horizontal axis shows a position from the node (P1) of the graded refractive index lens, a vertical axis shows a refraction index of the electro-optic material layer 1132. In FIG. 29A and FIG. 30, the refraction index graph of the electro-optic material layer 1132 changes, similar to a convex lens from the node of the graded refractive index lens to the center of the graded refractive index lens.

In FIG. 30, FIG. 31A, and FIG. 31B, a conversion method of liquid crystal layer having a uniform refraction index by turning off voltage of the graded refractive index lens is described.

A third voltage (V3) which is between a first voltage (V1) and a second voltage (V2) is applied to a certain position which is between the node (P1) of the graded refractive index lens and the center of the graded refractive index lens. In FIG. 31A, the voltage, which varies from the first voltage (V1) to the third voltage (V3), is displayed as a first section voltage (VD1). A region where the first section voltage (VD1) is applied is referred to as a first section (D1). In FIG. 31B, the voltage, which varies from the third voltage (V3) to the second voltage (V2) is displayed as a second section voltage (VD2). A region where the second section voltage (VD2) is applied is referred to as a second section (D2).

In FIG. 31A and FIG. 31B, a voltage is turned off at the same time at the first section (D1) and second section (D2), a long axis of the liquid crystal 1134 is parallel with the lower substrate 1131, and the refraction index is uniform as a second refraction index (n2), which is the maximum. Namely, the voltage corresponding to the liquid crystal 1134 described in FIG. 29C through one stage is applied to the electro-optic material layer 1132.

Therefore, the electro-optic material layer 1132 is converted into a liquid crystal layer having a uniform refraction index. In the liquid crystal layer state, the electro-optic unit 1103 displays a two-dimensional image, a three-dimensional image is displayed at the graded refractive index lens state. However, the time required for the conversion of all of the first section (D1) and the second section (D2) to the maximum of the refraction index may be more than a few seconds. The visibility may be poor due to the noticeable conversion of two-dimensional images to three-dimensional images.

Figure 32:
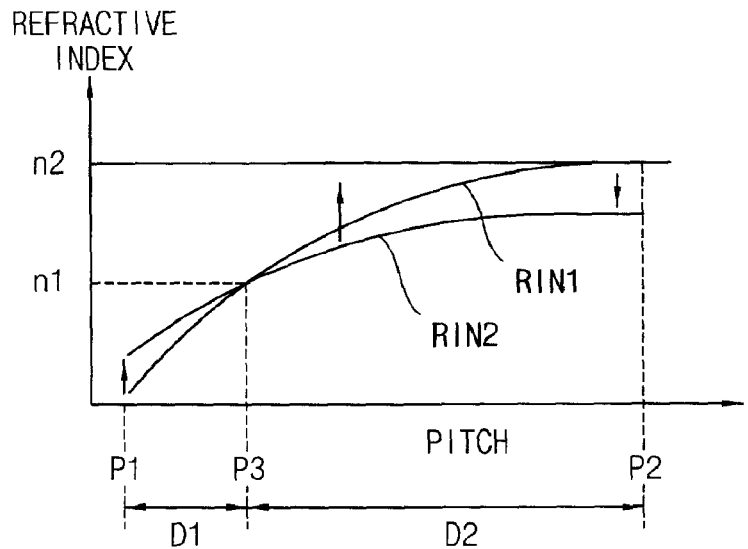
FIG. 32 is a graph showing the refraction index change of graded refractive index lens, the graded refractive index lens is a three-dimensional mode converted from a two-dimensional mode in two stages by applying a differential voltage according to a position of the graded refractive index lens.
Figure 33A:
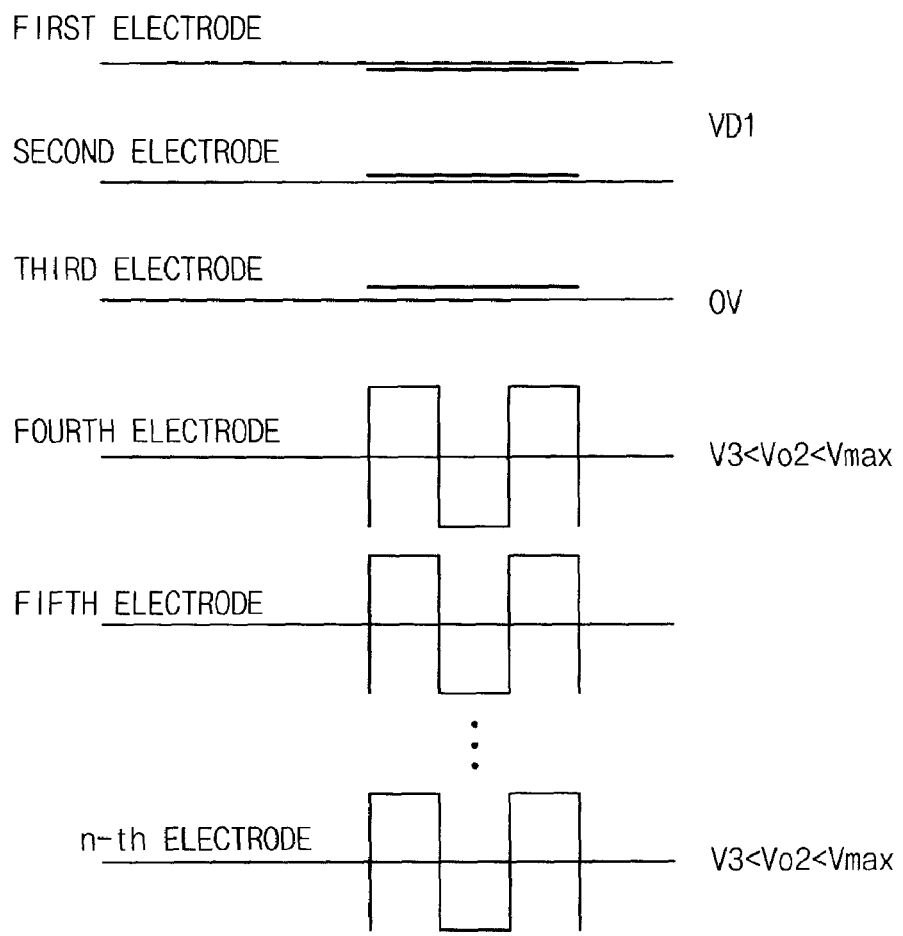
FIG. 33A is a waveform diagram of the driving signal applied to a lower electrode line to convert a three-dimensional mode described in FIG. 29A to a two-dimensional mode described in FIG. 29B.
Figure 33B:
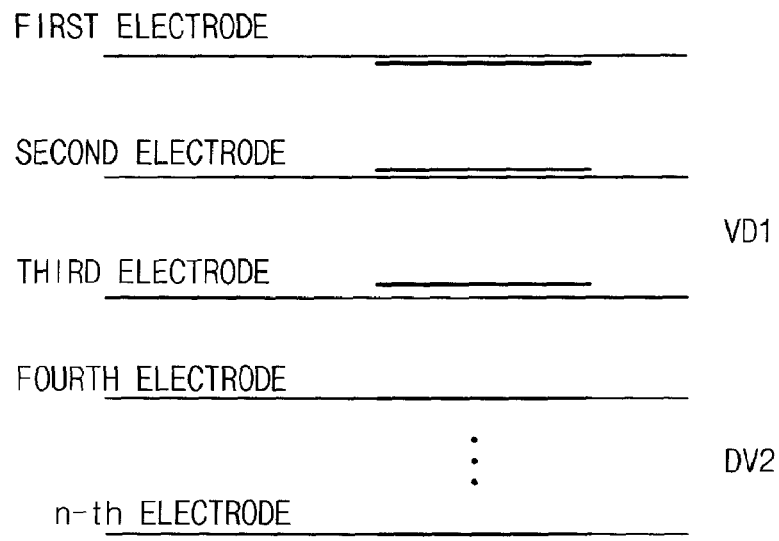
FIG. 33B is a waveform diagram of the driving signal applied to a lower electrode line to convert a two-dimensional mode described in FIG. 29B to a two-dimensional mode described in FIG. 29C.
Figure 34A:
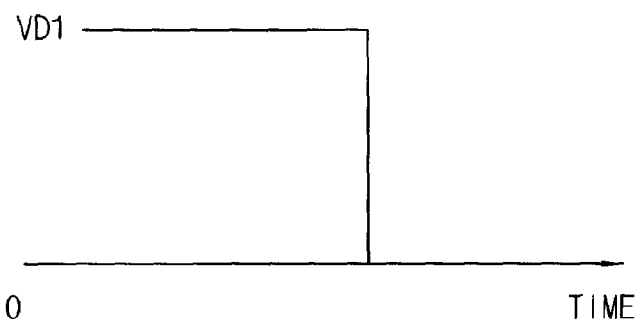
FIG. 34A and FIG. 34B are waveform diagrams of a driving voltage applied to the electro-optic material layer at the mode conversion method described in FIG. 32.
Figure 34B:
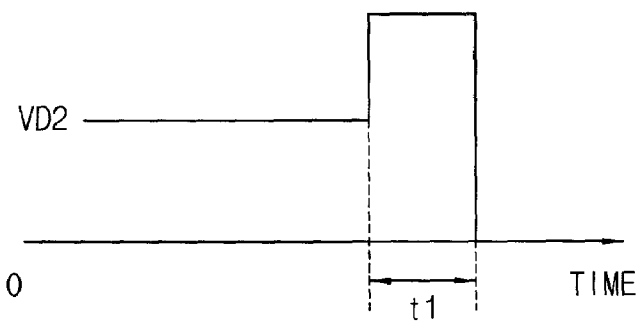

FIG. 32 is a graph showing the refraction index change of a graded refractive index lens, the graded refractive index lens is three-dimensional mode converted from two-dimensional mode in two stages by applying a differential voltage according to a position of the graded refractive index lens. FIG. 33A is a waveform diagram of the driving signal applied to a lower electrode line 1135 to convert a three-dimensional mode described in FIG. 29A to a two-dimensional mode described in FIG. 29C. FIG. 34A and FIG. 34B show a waveform diagram of a driving voltage applied to the electro-optic material layer 1132 at the mode conversion method described in FIG. 32.

Referring to FIG. 32, FIG. 33A, FIG. 33B, FIG. 34 A, and FIG. 34B, a voltage having a range from the first voltage (V1) to the third voltage (V3) at a first section (D1) of the graded refractive index lens is changed to the second voltage (V2). (step S10) As described in FIG. 34B, A voltage having a range from the third voltage (V3) to the second voltage (V2) at a second section (D2) of the graded refractive index lens is changed to the first voltage (V1) during a first time (t1). (step S20) After the first time (t1), The voltage of the second section (D2) of the graded refractive index lens is changed to the second voltage as described in FIG. 33B and FIG. 34B. (step S30). In this embodiment, the second voltage is 0V. But, a value of the second voltage is not limited.

Through the above stages, the refraction index of the graded refractive index lens described in FIG. 32 increases at the first section (D1) and decreases at the second section (D2), and thus the refraction index of the graded refractive index lens described in FIG. 32 is uniform as the first refraction index (n1) which is between the minimum refraction index and the maximum refraction index (n2). Thus, because the refraction index of the electro-optic material layer 1132 is uniform, the three-dimensional mode as described in FIG. 29A is converted to the two-dimensional mode. The graded refractive index lens state of the electro-optic material layer 1132 is clear before the state described in FIG. 29C; the electro-optic material layer 1132 is converted to the liquid crystal layer having a uniform first refraction index (n1). Therefore, the mode conversion time from three-dimensional to two-dimensional is considerably shortened, so a viewer may not perceive the mode conversion process.

On the other hand, the uniform first refraction index of the electro-optic material layer 1132 is converted to a uniform second refraction index by changing the voltage of the first section (D1) and second section (D2) to the second voltage. According to the present exemplary embodiment, the conversion from the three-dimensional mode to the two-dimensional mode is processed at two steps. The mode conversion is processed at a first step, and thus a time of mode conversion is shortened.

Figure 35A:
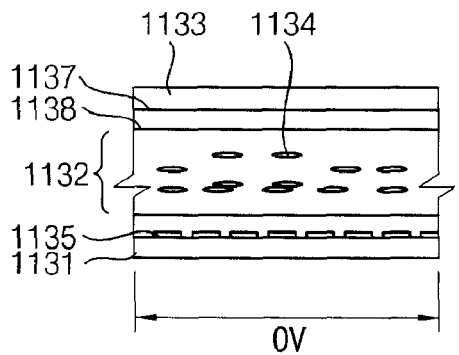
FIG. 35A, FIG. 35B, and FIG. 35C are cross-sectional views showing a graded refractive index lens state of the electro-optic material layer that is converted from the liquid crystal layer state of the electro-optic material layer by the mode conversion described in FIG. 32, FIG. 33A, FIG. 33B, FIG. 34A, and FIG. 34B.
Figure 35B:
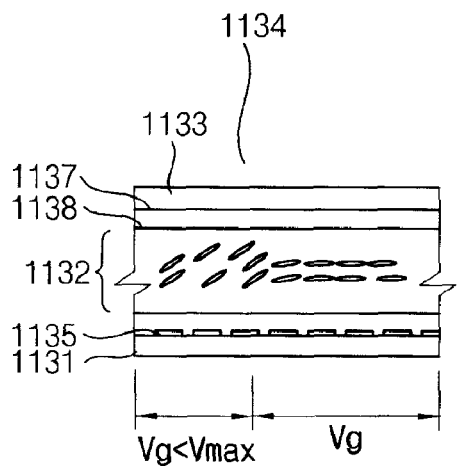
Figure 35C:
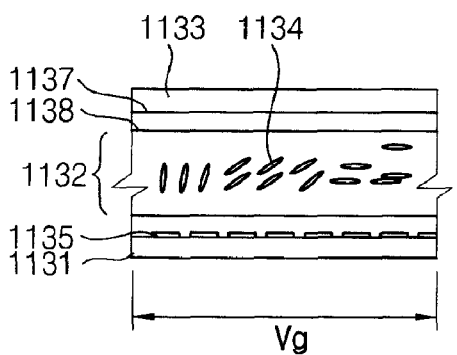
Figure 36A:
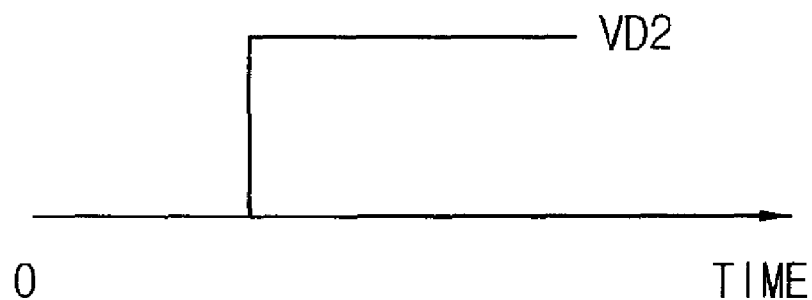
FIG. 36A and FIG. 36B are waveform diagrams showing a driving voltage applied to the electro-optic material layer at the mode conversion method described in FIG. 35A, FIG. 35B, and FIG. 35C.
Figure 36B:
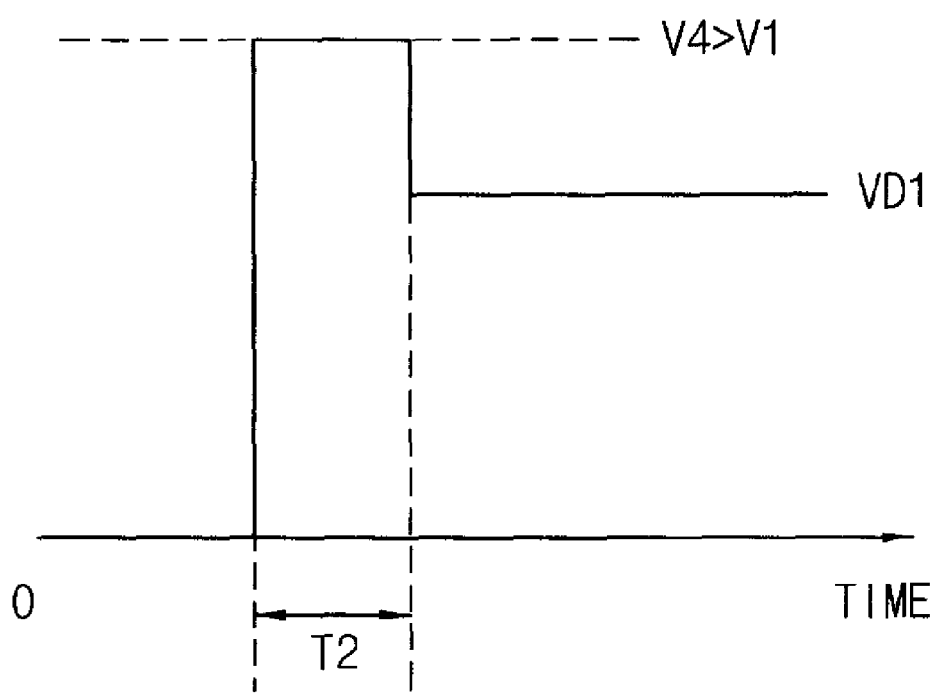

FIG. 35A, FIG. 35B, and FIG. 35C are cross-sectional views showing a graded refractive index lens state of the electro-optic material layer 1132, which is converted from the liquid crystal layer state of the electro-optic material layer 1132 by the mode conversion described in FIG. 32, FIG. 33A, FIG. 33B, FIG. 34A and FIG. 34B. FIG. 36A and FIG. 36B is a waveform diagram showing a driving voltage applied to the electro-optic material layer 1132 at the mode conversion method described in FIG. 35A, FIG. 35B, and FIG. 35C.

The graded refractive index lens is clear by the mode conversion described in FIG. 32, FIG. 33A, FIG. 33B, FIG. 34A and FIG. 34B., the electro-optic material layer 1132 is converted to the liquid crystal layer having a uniform second refraction index (n2) described in FIG. 35A. As described in FIG. 36A, the graded refractive index lens voltage which is from the third voltage (V3) to the second voltage (V2) is applied to the second section (D2) of the liquid crystal layer. (step S40)

As described in FIG. 36B, a fourth voltage (V4) is applied to the first section (D1) of the liquid crystal layer during a second time (t2). (step S50) The fourth voltage (V4) corresponding to a node of the graded refractive index lens voltage in stationary state is a higher level voltage than the first voltage (V1). By applying the fourth voltage during the second time (t2), the liquid crystal moves rapidly at the first section D1.

Continuously, after the second time (t2), a stationary state of voltage which is from the first voltage (V1) to the third voltage (V3) is applied to the first section (D1) of the liquid crystal layer described in FIG. 36B. (step S60) Therefore, the electro-optic material layer 1132 is converted to the graded refractive index lens of three-dimensional mode from the liquid crystal of two-dimensional mode through the process of FIG. 35A, FIG. 35B, FIG. 36A, and FIG. 36B. The fourth voltage (V4) being larger than a stationary state is applied to the first section (D1), and thus the time of mode conversion from the three-dimensional to two-dimensional is shortened. In the present embodiment, the driving method is described with a convex type. But the driving method may be applied to each sub-lens of the Fresnel lens.

According to the present embodiment, the time of mode conversion from the three-dimensional mode to two-dimensional mode of the electro-optic unit 1103 is shortened, so that a viewer may not perceive the mode conversion. Thus, the display device having the two or three-dimensional mode may have excellent display quality.

According to exemplary embodiments of the present invention, the mode conversion of two- and three-dimensions may be quick and easy, and the thickness may be thin so that enlargement of display may be easily achieved. Therefore, the present invention may be applied to an image display field where two- and three-dimensional image display is freely embodied.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
    a display panel configured to display an image;
    a lens unit comprising a plurality of lens parts, the lens unit being disposed in an image-emitting direction; and
    an electro-optic unit disposed between the display panel and the lens unit, the electro-optic unit comprising an electro-optic material layer comprising a variable refractive index that varies according to a position within an applied electric field generated from an applied voltage, the electro-optic material layer configured to form a graded refractive index lens,
    wherein a two-dimensional image or a three-dimensional image is selectively displayed according to a mode of the electro-optic unit.

2. The display device of claim 1, wherein the electro-optic unit further comprises:
    a lower substrate;
    a plurality of lower electrode lines disposed on a top surface of the lower substrate, each of the lower electrode lines being extended in a first direction;
    an upper substrate; and
    an upper electrode line extended in a second direction crossing the first direction and disposed on a bottom surface of the upper substrate,
    wherein the electro-optic material layer is disposed between the lower substrate and the upper substrate.

3. The display device of claim 2, wherein each of the lens parts have a lenticular shape extended in the first direction, and the plurality of the lower electrode lines is disposed within a width of one of the lens parts, the plurality of the lower electrode lines being arranged to the second direction.

4. The display device of claim 3, further comprising:
    a driving part configured to make a pitch of the graded refractive index lens be the same as a pitch of the one of the lens parts by applying a driving signal to the lower electrode lines and the upper electrode line, and configured to clear off the graded refractive index lens.

5. The display device of claim 4, wherein the graded refractive lens is formed as a convex lens.

6. The display device of claim 4, wherein the graded refractive lens is formed as a Fresnel lens having a plurality of sub-lenses.

7. The display device of claim 6, wherein the electro-optic unit further comprises:
    an electric field interference protection wall arranged on a boundary between adjacent sub-lenses of the sub-lenses, and extended from a surface of the lower substrate.

8. The display device of claim 4, wherein a focus of the graded refractive index lens and a focus of the one of the lens parts are formed at the same line, and the graded refractive index lens is formed as a convex lens or a convex Fresnel lens in the three-dimensional mode.

9. The display device of claim 8, wherein the focus of the graded refractive index lens passes a node of the one of the lens parts, the node is a boundary between the one of the lens parts and another of the lens parts having the same pitch as the pitch of the one of the lens part and being adjacent to the one of the lens part, and the graded refractive index lens is formed as a convex lens or a convex Fresnel lens in the two-dimensional mode.

10. The display device of claim 8, wherein the focus of the graded refractive index lens and the focus of the one of the lens parts are formed at the same line, and the graded refractive index lens is formed as the concave lens or the concave Fresnel lens in the two-dimensional mode.

11. A display device, comprising:
    a display panel to emit an image;
    a first electro-optic unit disposed on an upper portion of the display panel, and comprising a first electro-optic material layer, a refractive index of the first electro-optic material layer being changed according to a position corresponding to an electric field generated from an applied voltage to form a first graded refractive index lens; and
    a second electro-optic unit disposed on an upper portion of the first electro-optic unit, and comprising a second electro-optic material layer, a refractive index of the second electro-optic layer being changed according to a position corresponding to an electrical field generated from an applied voltage to form a second graded refractive index lens,
    wherein a two-dimensional image or a three-dimensional image is selectively displayed according to a mode of the first electro-optic unit and the second electro-optic unit.

12. The display device of claim 11, wherein the first electro-optic unit and the second electro-optic unit each further comprise:
    an upper substrate;
    a lower substrate ;
    a plurality of lower electrode lines, each of the plurality of lower electrode lines being extended in a first direction and the plurality of lower electrode lines being disposed on a top surface of the lower substrate; and
    an upper electrode line extended in a second direction substantially perpendicular to the first direction and disposed on a bottom surface of the upper substrate,
    wherein the first electro-optic material layer is disposed between the lower substrate of the first electro-optic unit and the upper substrate of the first electro-optic unit, and the second electro-optic material layer is disposed between the lower substrate of the second electro-optic unit and the upper substrate of the second electro-optic unit.

13. The display device of claim 12, further comprising:
a driving part to make a pitch of the first graded refractive index lens be the same as a pitch of the second graded refractive index lens, by applying a driving signal to the lower electrode lines of the first and second electro-optic units and the upper electrode lines of the first and second graded refractive index lens.

14. An electro-optic unit, comprising:
a first substrate;
a second substrate;
an electro-optic material layer disposed between the first substrate and the second substrate, and a refractive index of the electro-optic material layer being changed according to a position corresponding to an electrical field generated from an applied voltage, and the electric field being applied by the first substrate and the second substrate, to form a graded refractive index lens as a Fresnel lens having a plurality of sub-lenses; and
an electric field interference protection wall corresponding to a boundary between adjacent sub-lenses of the plurality of sub-lenses, and extended to the electro-optic material layer from the first substrate.

15. The electro-optic unit of claim 14, wherein the first substrate comprises:
a lower substrate;
lower electrode lines disposed at a pitch of the graded refractive index lens, each of the lower electrode lines extending in a first direction and the lower electrode lines being disposed on the lower substrate,
wherein the second substrate comprises:
an upper substrate;
an upper electrode line extending in a second direction perpendicular to the first direction on the upper substrate,
wherein the electro-optic material layer comprises a liquid crystal.

16. The electro-optic unit of claim 15, further comprising:
a driving part applying a driving signal to the lower electrode lines and the upper electrode line,
wherein the electro-optic material layer forms the graded refractive index lens by the applied driving signal.

17. The electro-optic unit of claim 16, wherein the graded refractive index lens comprises the plurality of sub-lenses, one of the plurality of sub-lenses having the same pitch as the others of the plurality of sub-lenses at the Fresnel lens.

18. The electro-optic unit of claim 16, wherein a width of one of the lower electrode lines corresponding to one of the plurality of sub-lenses having the larger pitch is wider than a width of another of the lower electrode lines corresponding to another of the plurality of sub-lenses having the smaller pitch.

19. The electro-optic unit of claim 15, wherein a width of a lower electrode line corresponding to the boundary between the adjacent sub-lenses is smaller than a width of other lower electrode lines.

20. A method of driving an electro-optic unit, wherein the electro-optic unit comprises an electro-optic material layer to operate in a first mode as a liquid crystal layer having a uniform refractive index and to operate in a second mode as a graded refractive index lens having a various refractive index corresponding to a poison according to an applied voltage, the applied voltage ranging from a first voltage to a second voltage and the first voltage through the second voltage being respectively applied to an outline through a center of the graded refractive index lens at the second mode, the method comprising:
changing a voltage, which has a range from the first voltage to a third voltage, to the second voltage at a first section of the graded refractive index lens, and the third voltage being between the first voltage and the second voltage;
changing a voltage, which has a range from the third voltage to the second voltage, to the first voltage at a second section of the graded refractive index lens during a first time period; and
changing the voltage at the second section of the graded refractive index lens to the second voltage after the first time period,
wherein the electro-optic material layer operates in the first mode as the liquid crystal layer where the graded refractive index lens is cleared off.

21. The method of claim 20, wherein the electro-optic material layer at the first section and the second section has a uniform first refractive index at the end of the first time period.

22. The method of claim 21, wherein the electro-optic material layer has a uniform second refractive index converted from the first refractive index by applying the second voltage to the first section and the second section.

23. The method of claim 20, further comprising:
applying a voltage to the second section of the liquid crystal layer, the voltage ranged from the third voltage to the second voltage;
applying a fourth voltage to the first section of the liquid crystal layer during a second time, the fourth voltage being more than the first voltage; and
applying a voltage to the first section of the liquid crystal layer after the second time, the voltage being ranged from the first voltage to the third voltage,
wherein the electro-optic layer operates in the second mode as the graded refractive index lens.

* * * * *